US00RE40362E

(19) United States
(12) Reissued Patent
Sternlieb et al.

(10) Patent Number: US RE40,362 E
(45) Date of Reissued Patent: Jun. 10, 2008

(54) APPARATUS AND METHOD FOR HYDROENHANCING FABRIC

(75) Inventors: Herschel Sternlieb, Brunswick, ME (US); Jodie M. Siegel, Watertown, MA (US); John M. Greenway, Westwood, MA (US)

(73) Assignee: Polymer Group, Inc., Charlotte, NC (US)

(21) Appl. No.: 08/049,227
(22) PCT Filed: Apr. 14, 1989
(86) PCT No.: PCT/US85/01593

§ 371 (c)(1),
(2), (4) Date: May 18, 1989

Related U.S. Patent Documents

Reissue of:
(64) Patent No.: 4,967,456
Issued: Nov. 6, 1990
Appl. No.: 07/382,160
Filed: Apr. 14, 1989

U.S. Applications:
(63) Continuation-in-part of application No. 07/184,350, filed on Apr. 21, 1988, now abandoned, which is a continuation-in-part of application No. 07/041,542, filed on Apr. 23, 1987, now abandoned.

(51) Int. Cl.
*D04H 1/46* (2006.01)

(52) U.S. Cl. ..... 28/104; 8/151.2; 28/167; 68/205 R

(58) Field of Classification Search ..... 26/19; 28/104, 167; 428/225; 8/151.2; 68/205 R
See application file for complete search history.

(56) References Cited

U.S. PATENT DOCUMENTS

| | | | |
|---|---|---|---|
| 2,241,222 A | 5/1941 | Sonnino | 26/2 |
| 2,862,251 A | 12/1958 | Kalwaites | 19/161 |
| 2,981,999 A | 5/1961 | Russel | 28/1 |
| 3,010,179 A | 11/1961 | Thal | 28/72 |
| 3,033,721 A | 5/1962 | Kalwaites | 154/46 |
| 3,081,515 A | 3/1963 | Griswold et al. | 28/70 |

(Continued)

FOREIGN PATENT DOCUMENTS

| | | |
|---|---|---|
| AU | 287821 | 9/1964 |
| CA | 739652 | 8/1966 |
| DK | 4386/85 | 3/1986 |
| EP | 0 099 639 | 2/1984 |
| EP | 0177277 | 4/1986 |
| EP | 0210777 | 2/1987 |

(Continued)

OTHER PUBLICATIONS

America's Fabrics, Origin and History, Manufacture, Characteristics and Uses, Bendure and Pfeiffer, MacMillan Co, 1947, pp. 542–3.*
Textile Science, An Introductory Manual, Marsh, Chapman & Hall Ltd. 1949, pp. 329–333.*
Woolen and Worsted, Beaumont, G. Bell and Sons, Ltd., 1915 pp. 625–627.*
Kenneth R. Randall, "Hydroentanglement Technology for Wet–Laid Applicaitons", *Nonwovens World*, pp. 28–31, Mar., 1989.

*Primary Examiner*—Danny Worrell
(74) *Attorney, Agent, or Firm*—Kilyk & Bowersox, PLLC; Valerie Calloway

(57) ABSTRACT

An apparatus 10 and related process for enhancement of woven and knit fabrics through use of dynamic fluids which entangle and bloom fabric yarns. A two stage enhancement process is employed in which top and bottom sides of the fabric are respectively supported on members 22, 34 and impacted with a fluid curtain including high pressure jet streams. Controlled process energies and use of support members 22, 34 having open areas 26, 36 which are aligned in offset relation to the process line produces fabrics having a uniform finish and improved characteristics including, edge fray, drape, stability, abrasion resistance, fabric weight and thickness.

70 Claims, 17 Drawing Sheets

U.S. PATENT DOCUMENTS 3,088,859 A 5/1963 Smith ..... 28/106 X
3,113,349 A 12/1963 Nottebohm et al. ..... 19/161
3,157,633 A 11/1964 Khun et al. ..... 260/200
3,214,819 A 11/1965 Guerin ..... 28/72.2
3,256,581 A 6/1966 Thal et al.
3,333,315 A 8/1967 Dyer et al. ..... 28/72.2
3,403,862 A 10/1968 Dworjanyn ..... 239/586
3,422,510 A 1/1969 Livingston et al. ..... 28/1
3,434,188 A 3/1969 Summers ..... 28/72.2
3,443,878 A 5/1969 Weber et al.
3,458,905 A 8/1969 Dodson, Jr. et al. ..... 19/161
3,485,706 A 12/1969 Evans ..... 161/72
3,485,708 A 12/1969 Ballou et al. ..... 161/72
3,485,709 A 12/1969 Evans et al. ..... 161/109
3,486,168 A 12/1969 Evans et al. ..... 161/169
3,493,462 A 2/1970 Bunting, Jr. et al. ..... 161/169
3,494,821 A 2/1970 Evans ..... 161/169
3,498,874 A 3/1970 Evans et al. ..... 161/109
3,508,308 A 4/1970 Bunting, Jr. et al. ..... 28/72.2
3,523,346 A 8/1970 Bolen et al. ..... 26/28
3,531,363 A 9/1970 Shambeian ..... 161/72
3,537,945 A 11/1970 Summers ..... 428/292 X
3,542,632 A 11/1970 Eickhoff ..... 161/65
3,546,755 A 12/1970 Lynch ..... 28/72.2
3,560,326 A 2/1971 Bunting, Jr. et al. ..... 161/169
3,574,106 A 4/1971 Bragg ..... 428/91
3,597,851 A * 8/1971 Arendt et al. ..... 26/19
3,613,186 A 10/1971 Mazzone et al. ..... 26/69 R
3,616,175 A 10/1971 Jung ..... 161/164
3,620,903 A 11/1971 Bunting, Jr. et al. ..... 161/169
3,635,625 A 1/1972 Voss ..... 425/135
3,681,182 A 8/1972 Kalwaites ..... 28/105
3,682,756 A 8/1972 Kalwaites ..... 28/105
3,688,355 A 9/1972 Okzaki et al. ..... 28/1.4
3,707,746 A 1/1973 Summers ..... 28/72.2
3,747,161 A 7/1973 Kalwaites ..... 19/161
3,750,236 A 8/1973 Kalwaites
3,750,237 A 8/1973 Kalwaites ..... 19/161 P
3,768,121 A 10/1973 Kalwaites ..... 19/161 P
3,769,659 A 11/1973 Kalwaites ..... 19/161 P
3,787,932 A 1/1974 Kalwaites ..... 19/161 P
3,800,364 A 4/1974 Kalwaites ..... 19/161 P
3,837,046 A 9/1974 Kalwaites ..... 19/161 P
3,873,255 A 3/1975 Kalwaites ..... 425/83
3,906,130 A 9/1975 Tsurumi et al.
3,917,785 A 11/1975 Kalwaites ..... 264/108
3,960,485 A 6/1976 Fantl et al.
3,967,470 A 7/1976 Miura et al.
4,023,526 A 5/1977 Ashus et al.
4,024,612 A 5/1977 Contractor et al. ..... 28/72.2 F
4,069,563 A 1/1978 Contractor et al. ..... 28/105
4,085,485 A 4/1978 Brandon et al. ..... 28/104
4,099,913 A 7/1978 Walter et al.
4,109,353 A 8/1978 Mitchell et al.
4,124,428 A 11/1978 Forest
4,144,370 A 3/1979 Boulton ..... 428/233
4,145,468 A 3/1979 Mizoguchi et al. ..... 428/239
4,146,663 A 3/1979 Ikeda et al. ..... 428/96
4,152,480 A 5/1979 Adachi et al. ..... 428/227
4,156,957 A 6/1979 McKay ..... 28/159
4,167,600 A 9/1979 Benzaquen ..... 428/91
4,190,695 A 2/1980 Niederhauser ..... 428/92
4,228,123 A 10/1980 Marshall ..... 264/557
4,233,349 A 11/1980 Niederhauser ..... 428/92
4,251,587 A 2/1981 Mimura et al. ..... 428/233
4,277,266 A 7/1981 Dick
4,323,760 A 4/1982 Greenway et al.
4,329,763 A 5/1982 Alexander et al. ..... 28/104
4,364,156 A 12/1982 Greenway et al.
4,368,227 A 1/1983 Setsuie et al. ..... 428/91
4,379,799 A 4/1983 Holmes ..... 28/104 X
4,393,562 A 7/1983 Stokes ..... 26/69 R
4,410,579 A 10/1983 Johns ..... 428/131
4,418,451 A 12/1983 Crenshaw
4,426,420 A 1/1984 Likhyani ..... 428/224
4,426,421 A 1/1984 Nakamae et al. ..... 428/234
4,442,161 A 4/1984 Kirayoglu et al. ..... 428/219
RE31,601 E 6/1984 Ikeda et al. ..... 428/93
4,453,298 A 6/1984 Nabulon et al. ..... 28/255
4,471,514 A 9/1984 Stokes
4,497,095 A 2/1985 Minemura et al. ..... 26/2 R
4,499,637 A 2/1985 Greenway ..... 26/2 R
4,562,097 A 12/1985 Walter et al.
4,578,845 A 4/1986 Young, Jr.
4,582,666 A 4/1986 Kenworthy et al. ..... 264/557
4,591,513 A 5/1986 Suzuki et al. ..... 427/200
4,612,237 A 9/1986 Frankenburg ..... 428/219
4,647,490 A 3/1987 Bailey et al. ..... 428/131
4,665,597 A 5/1987 Suzuki et al. ..... 28/104
4,691,417 A 9/1987 Vuillaume ..... 28/105
4,693,922 A 9/1987 Buyofski et al. ..... 28/105 X
4,695,422 A 9/1987 Curro et al. ..... 264/504
4,695,500 A 9/1987 Dyer et al. ..... 428/134
4,718,152 A 1/1988 Suzuki et al. ..... 28/194
4,743,483 A 5/1988 Shimizu et al. ..... 428/89
4,767,584 A 8/1988 Siler ..... 425/385 X
4,805,275 A 2/1989 Suzuki et al. ..... 28/104
4,808,467 A 2/1989 Suskind et al. ..... 428/284
4,828,174 A 5/1989 Love, III
4,960,630 A 10/1990 Greenway et al.
4,967,456 A 11/1990 Sternleib et al.
5,033,143 A 7/1991 Love, III
5,037,692 A 8/1991 Miyazaki et al. ..... 428/252
5,047,276 A 9/1991 Chomarat et al.
5,115,544 A 5/1992 Widen ..... 28/105
5,136,761 A 8/1992 Sternleib et al.
5,142,753 A 9/1992 Bolliand et al. ..... 28/167
5,173,360 A 12/1992 Hiroe et al. ..... 428/229

FOREIGN PATENT DOCUMENTS

EP 0215684 3/1987
EP 0228197 7/1987
FI 853707 3/1986
FR 7410272 3/1974
GB 1015499 11/1963
GB 952819 3/1964
GB 978452 12/1964
GB 1063252 3/1967
GB 1101899 1/1968
GB 1380071 1/1975
GB 1515455 6/1978
JP 36-8145 6/1961
JP 46-9876 3/1971
JP 54-11433 5/1979
JP 57-35051 2/1982
JP 61-6368 1/1986
JP 61-55253 3/1986
JP 61-252336 11/1986
JP 61-252339 11/1986
JP 61-58573 12/1986
JP 62-28466 2/1987
JP 62-55253 3/1987
JP 62-69866 3/1987
JP 62-149961 7/1987
JP 63-303173 12/1988
PT 81218 3/1986
WO 89/09850 10/1989
WO 89/10441 11/1989

* cited by examiner

APPARATUS AND METHOD FOR HYDROENHANCING FABRIC

Matter enclosed in heavy brackets [ ] appears in the original patent but forms no part of this reissue specification; matter printed in italics indicates the additions made by reissue.

CROSS REFERENCE TO RELATED APPLICATIONS

This application is a continuation-in-part of U.S. Ser. Nos. 07/041,542 and 07/184,350, respectively filed Apr. 23, 1987; and Apr. 21, 1988, and now both abandoned.

FIELD OF INVENTION

This invention generally relates to a textile finishing process for upgrading the quality of woven and knit fabrics. More particularly, it is concerned with a hydroentangling process which enhances woven and knit fabrics through use of dynamic fluid jets to entangle and cause fabric yarns to bloom. Fabrics produced by the method of the invention have enhanced surface finish and improved characteristics such as cover, abrasion resistance, drape, stability as well as reduced air permeability, wrinkle recovery, seam slippage, and edge fray.

BACKGROUND ART

The quality of a woven or knit fabric can be measured by various properties, such as, the yarn count, thread count, abrasion resistance, cover, weight, yarn bulk, yarn bloom, torque resistance, wrinkle recovery, drape and hand.

Yarn count is the numerical designation given to indicate yarn size and is the relationship of length to weight.

Thread count is woven or knit fabrics, respectively, defines the number ends and picks, and wales and courses per inch of fabric. For example, the count of cloth is indicated by enumerating first the number of warp ends per inch, then the number of filling picks per inch. Thus, 68×72 defines a fabric having 68 warp ends and 72 filling picks per inch.

Abrasion resistance is the ability of a fabric to withstand loss of appearance, utility, pile or surface through destructive action of surface wear and rubbing.

Cover is the degree to which underlying structure in a fabric is concealed by surface material. A measure of cover is provided by fabric air permeability, that is, the ease with which air passes through the fabric Permeability measures fundamental fabric qualities and characteristics such as filtration and cover.

Yarn bloom is a measure of the opening and spread of filters in yarn.

Fabric weight is measured in weight per unit area, for example, the number of ounces per square yard.

Torque of fabric refers to that characteristic which tends to make it turn on itself as a result of twisting. It is desirable to remove or diminish torque in fabrics. For example, fabrics used in vertical blinds should have no torque, since such torque will make the fabric twist when hanging in a strip.

Wrinkle recovery is the property of a fabric which enables it to recover from folding deformations.

Hand refers to tactile fabric properties such as softness and drapability.

It is known in the prior art to employ hydroentangling processes in the production of nonwoven materials. In conventional hydroentangling processes, webs of nonwoven fibers are treated with high pressure fluids while supported on apertured patterning screens. Typically, the patterning screen is provided on a drum or continuous planar conveyor which traverses pressurized fluid jets to entangle the web into cohesive ordered fiber groups and configurations corresponding to open areas in the screen. Entanglement is effected by action of the fluid jets which cause fibers in the web to migrate to open areas in the screen, entangle and intertwine.

Prior art hydroentangling processes for producing patterned nonwoven fabrics are represented by U.S. Pat. Nos. 3,485,706 and 3,498,874, respectively, to Evans and Evans et al., and U.S. Pat. Nos. 3,873,255 and 3,917,785 to Kalwaites.

Hydroentangling technology has also been employed by the art to enhance woven and knit fabrics. In such applications warp and pick fibers in fabrics are hydroentangled at crossover points to effect enhancement in fabric cover. However, conventional processes have not proved entirely satisfactory in yielding uniform fabric enhancement. The art has also failed to develop apparatus and process line technology which achieves production line efficiencies.

Australian Patent Specification 287821 to Bunting et al. is representative of the state of the art. Bunting impacts high speed columnar fluid streams on fabrics supported on course porous members. Preferred parameters employed in the Bunting process, described in the Specification Example Nos. XV–XVII, include 20 and 30 mesh support screens, fluid pressure of 1500 psi, and jet orifices having 0.007 inch diameters on 0.050 inch centers. Fabrics are processed employing multiple hydroentangling passes in which the fabric is reoriented on a bias direction with respect to the process direction in order to effect uniform entanglement. Data set forth in the Examples evidences a modest enhancement in fabric cover and stability.

Another approach of art is represented by European Patent Application No. 0 177 277 to Willbanks et al. which is directed to hydropatterning technology. Willbanks impinges high velocity fluids onto woven, knitted and bonded fabrics for decorative effects. Patterning is effected by redistributing yarn tension within the fabric

- yarns are selectively compacted, loosened and opened
- to impart relief structure to the fabric.

Fabric enhancement of limited extent is obtained in Willbanks as a secondary product of the patterning process. However, Willbanks fails to suggest or teach a hydroentangling process that can be employed to uniformly enhance fabric characteristics. See Willbanks Example 4, page 40.

There is a need in the art for an improved woven textile hydroenhancing process which is commercially viable. It will be appreciated that fabric enhancement offers aesthetic and functional advantages which have application in a wide diversity of fabrics. Hydroenhancement improves fabric cover through dynamic fluid entanglement and bulking of fabric yarns for improved fabric stability. These results are advantageously obtained without requirement of conventional fabric finishing processes.

The art also requires apparatus of uncomplex design for hydroenhancing textile materials. Commercial production requires apparatus for continuous fabric hydroenhancing and in-line drying of such fabrics under controlled conditions to yield fabrics of uniform specifications.

Accordingly, it is a broad object of the invention to provide an improved textile hydroenhancing process and related apparatus for production of a variety of novel woven and knit fabrics having improved characteristics which advance the art.

A more specific object of the invention is to provide is hydroenhancing process for enhancement of fabrics made of spun and spun/filament yarn.

Another object of the invention is to provide a hydroenhancing process having application for the fabrication of novel composite and layered fabrics.

A further object of the invention is to provide a hydroenhancing production line apparatus which is less complex and improved over the prior art.

DISCLOSURE OF THE INVENTION

In the present invention, these purposes, as well as others which will be apparent, are achieved generally by providing an apparatus and a related method for hydroenhancing woven and knit fabrics through dynamic fluid action. A hydroenhancing module is employed in the invention in which the fabric is supported on a member and impacted with a fluid curtain under controlled process energies. Enhancement of the fabric is effected by entanglement and intertwining of yarn fibers at cross-over points in the fabric weave or knit. Fabrics enhanced in accordance with the invention have a uniform finish and improved characteristics, such as, edge fray, drape, stability, wrinkle recovery, abrasion resistance, fabric weight and thickness.

According to the preferred method of the invention, the woven or knit fabric is advanced on a process line through a weft straightener to two in-line fluid modules for first and second stage fabric enhancement. Top and bottom sides of the fabric are respectively supported on members in the modules and impacted by fluid curtains to impart a uniform finish to the fabric. Preferred support members are fluid pervious, include open areas of approximately 25%, and have fine mesh patterns which permit fluid passage without imparting a patterned effect to the fabric. It is a feature of the invention to employ support members in the modules which include fine mesh patterned screens which are arranged in offset relation with respect to the process line. This offset orientation limits fluid streaks and eliminates reed marking in processed fabrics.

First and second stage enhancement is preferably effected by columnar fluid jets which impact the fabric at pressures within the range of 200 to 3000 psi and impart a total energy to the fabric of approximately 0.10 to 2.0 hp-hr/lb.

Following enhancement, the fabric is advanced to a tenter frame which dries the fabric to a specified width under tension to produce a uniform fabric finish.

Advantage in the invention apparatus is obtained by provision of a continuous process line of uncomplex design. The first and second enhancement stations include a plurality of cross-directionally ("CD") aligned and spaced manifolds. Columnar jet nozzles having orifice diameters of approximately 0.005 inches with center-to-center spacings of approximately 0.017 inches are mounted approximately 0.5 inches from the screens. At the process energies of the invention, this spacing arrangement provides a curtain of fluid which yields a uniform fabric enhancement. Use of fluid pervious support members which are oriented in offset relation, preferably 45°, effectively limits jet streaks and eliminates reed markings in processed fabrics.

Optimum fabric enhancement results are obtained in fabrics woven or knit of yarns including fibers with deniers and staple lengths in the range of 0.5 to 6.0, and 0.5 to 5 inches, respectively, and yarn counts in the range of 0.5s to 50s. Preferred yarn spinning systems of the invention fabrics include cotton spun, wrap spun, wool spun and friction spun.

Other objects, features and advantages of the present invention will be apparent when the detailed description of the preferred embodiments of the invention are considered in conjunction with the drawings which should be construed in an illustrative and not limiting sense as follows:

BEST MODE OF CARRYING OUT THE INVENTION

Figure 1:
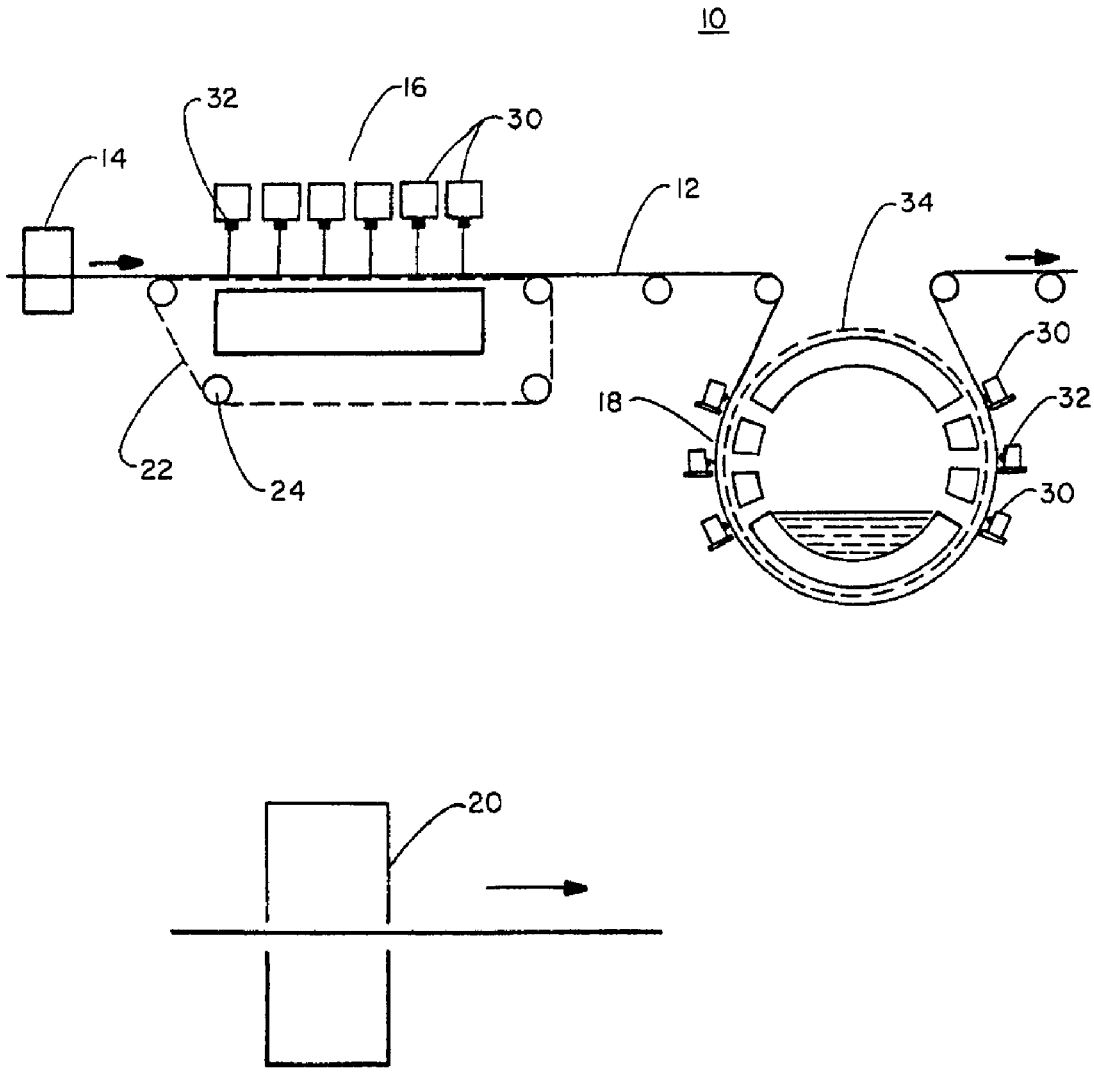
FIG. 1 is a schematic view of a production line including a weft straightener, flat and drum hydroenhancing modules, and tenter frame, for the hydroenhancement of woven and knit fabrics in accordance with the invention.

With further reference to the drawings, FIG. 1 illustrates a preferred embodiment of a production line of the invention, generally designated 10, for hydroenhancement of a fabric 12 including spun and/or spun/filament yarns. The line includes a conventional weft straightener 14, and drum enhancing modules 16, 18, and a tenter frame 20.

Modules 16, 18 effect two sided enhancement of the fabric through fluid entanglement and bulking of fabric yarns. Such entanglement is imparted to the fabric in areas of yarn crossover or intersection. Control of process energies and provision of a uniform curtain of fluid produces fabrics having a uniform finish and improved characteristics including, edge fray, torque, wrinkle recovery, cupping, drape, stability, abrasion resistance, fabric weight and thickness.

METHOD AND MECHANISM OF THE ENHANCING MODULES

Fabric is advanced through the weft straightener 14 which aligns the fabric weft prior to processing in enhancement modules 16, 18. Following the hydroenhancement, the fabric is advanced to the tenter frame 20, which is of conventional design, where it is dried under tension to produce a uniform fabric or specified width.

Module 16 includes a first support member 22 which is supported on an endless conveyor means including rollers 24 and drive means (not shown) for rotation of the rollers. Preferred line speeds for the conveyor are in the range of 10 to 500 ft/min. Line speeds are adjusted in accordance with process energy requirements which vary as a function of fabric type and weight.

Figure 2A:
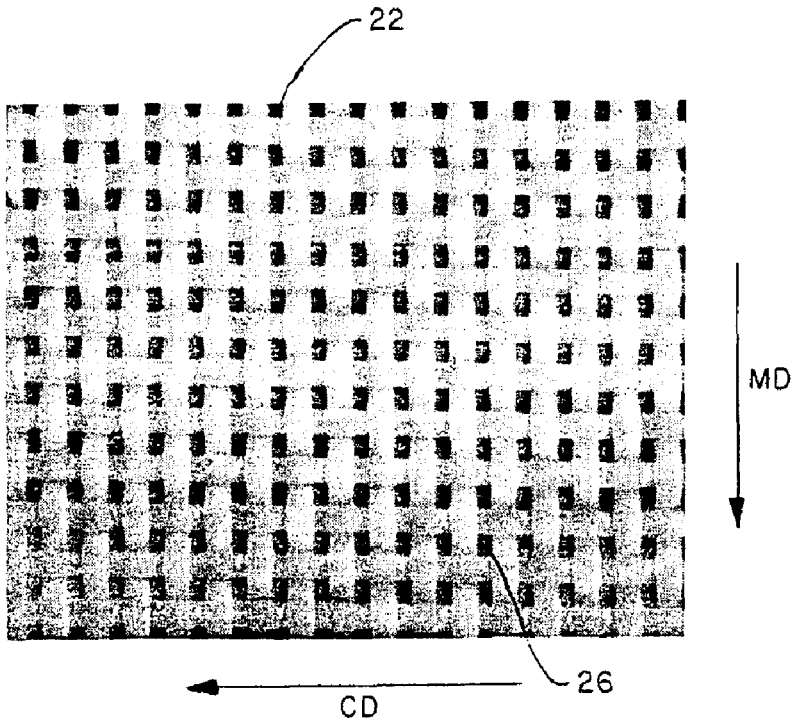
FIGS. 2A and B are photographs at 10× magnification of 36×29 90° and 40×40 45° mesh plain weave support members, respectively, employed in the flat and drum enhancing modules of FIG. 1.

Support member 22, which preferably has a flat configuration, includes closely spaced fluid pervious open areas 26. A preferred support member 22, shown in FIG. 2A, is a 36×29 90° mesh plain weave having a 23.7% open area, fabricated of polyester warp and shute round wire. Support member 22 is a tight seamless weave which is not subject to angular displacement or snag. Specifications for the screen, which is manufactured by Albany International, Appleton Wire Division, P.O. Box 1939, Appleton, Wis. 54913 are set forth in Table I.

TABLE I

Support Screen Specifications

| Property | 36 × 29 90° flat mesh | 40 × 40 45° drum mesh |
|---|---|---|
| Wire | polyester | stainless steel |
| Warp wire | .0157 | 0.010 |
| Shute wire | .0157 | 0.010 |
| Weave type | plain | plain |
| Open area | 23.7% | 36% |

Module 16 also includes an arrangement of parallel and spaced manifolds 30 oriented in a cross-direction ("CD") relative to movement of the fabric 12. The manifolds which are spaced approximately 8 inches apart each include a plurality of closely aligned and spaced columnar jet orifices 32 which are spaced approximately 0.5 inches from the support member 22.

The jet orifices have diameters and center-to-center spacings in the range of 0.005 to 0.010 inches and 0.017 to 0.034 inches, respectively, and are designed to impact the fabric with fluid pressures in the range of 200 to 3000 psi. Preferred orifices have diameters of approximately 0.005 inches with center-to-center spacings of approximately 0.017 inches.

This arrangement of fluid jets provides a curtain of fluid entangling streams which yield optimum enhancement in the fabric. Energy input to the fabric is cumulative along the line and preferably set at approximately the same level in modules 16, 18 (two stage system) to impart uniform enhancement to top and bottom surfaces of the fabric. Effective first stage enhancement of fabric yarn is achieved at an energy output of at least 0.05 hp-hr/lb and preferably in the range of 0.1 to 2.0 hp-hr/lb.

Figure 2B:
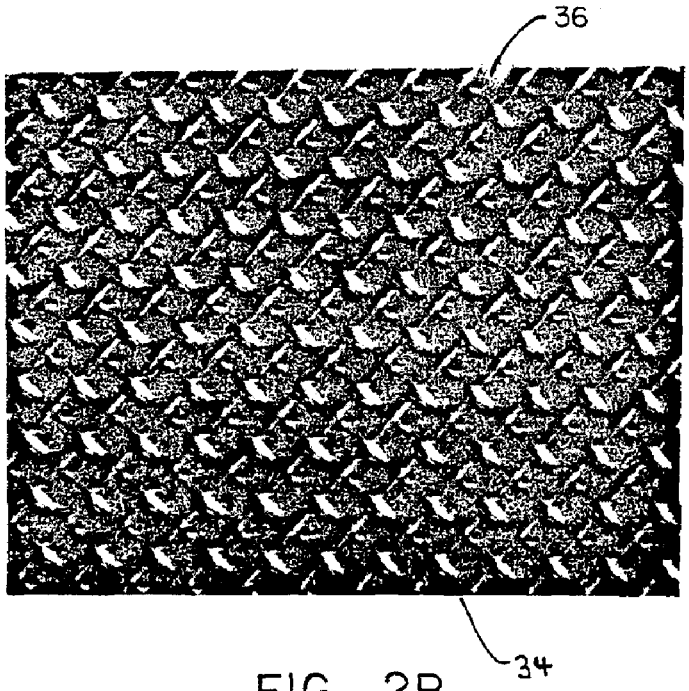

Following the first stage enhancement, the fabric is advanced to module 18 which enhances the other side of the fabric. Module 18 includes a second support member 34 of cylindrical configuration which is supported on a drum. The member 34 includes closely spaced fluid pervious open areas 36 which comprise approximately 36% of the screen area. A preferred support member 34, shown in FIG. 2B, is a 40×40 45° mesh stainless steel screen, manufactured by Appleton Wire, having the specifications set forth in Table I.

Module 18 functions in the same manner as the planar module 16. Manifolds 30 and jet orifices 32 are provided which have substantially the same specifications as in the first stage enhancement module. First energy to the fabric of at least 0.5 hp-hr/lb and preferably in the range of 0.1 to 2.0 hp-hr/lb effects second stage enhancement.

Figure 3A:
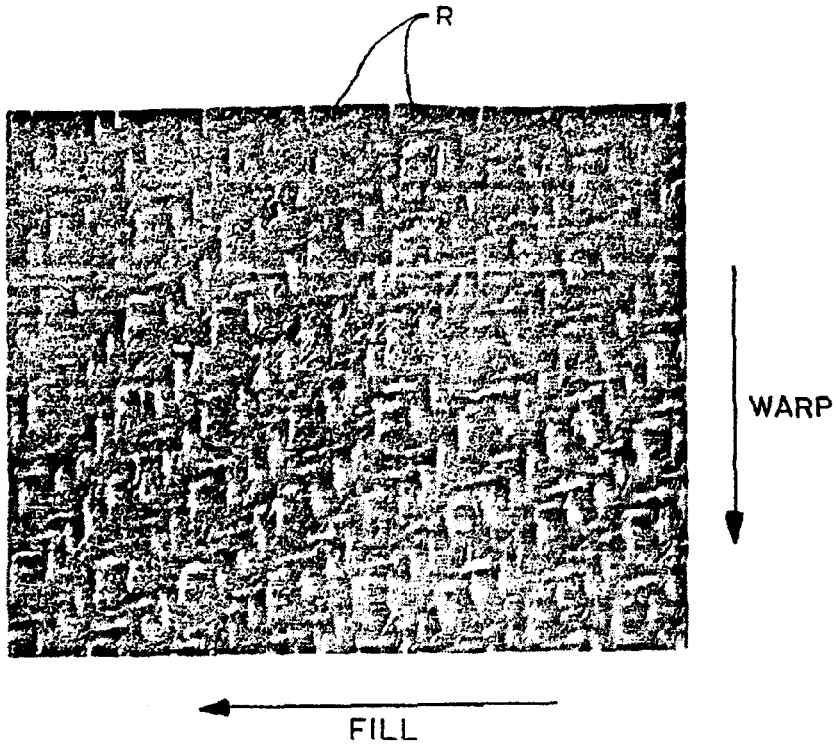
FIGS. 3A and B are photomicrographs at 10× magnification of a fine polyester woven fabric before and after hydroenhancement in accordance with the invention.
Figure 3B:
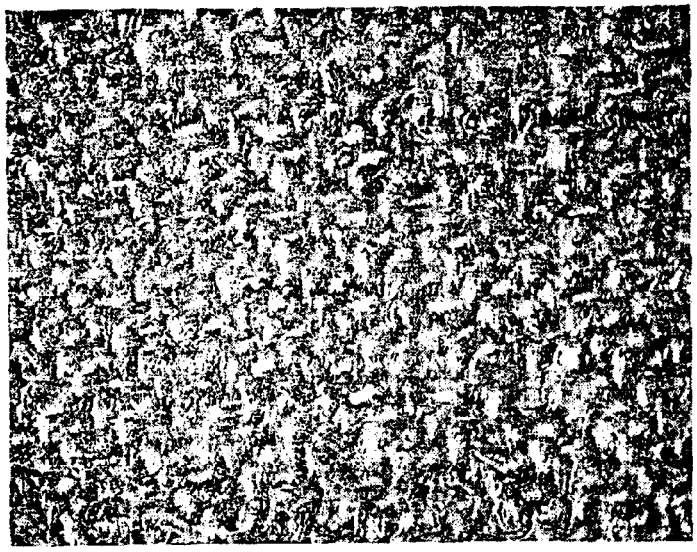
Figure 4A:
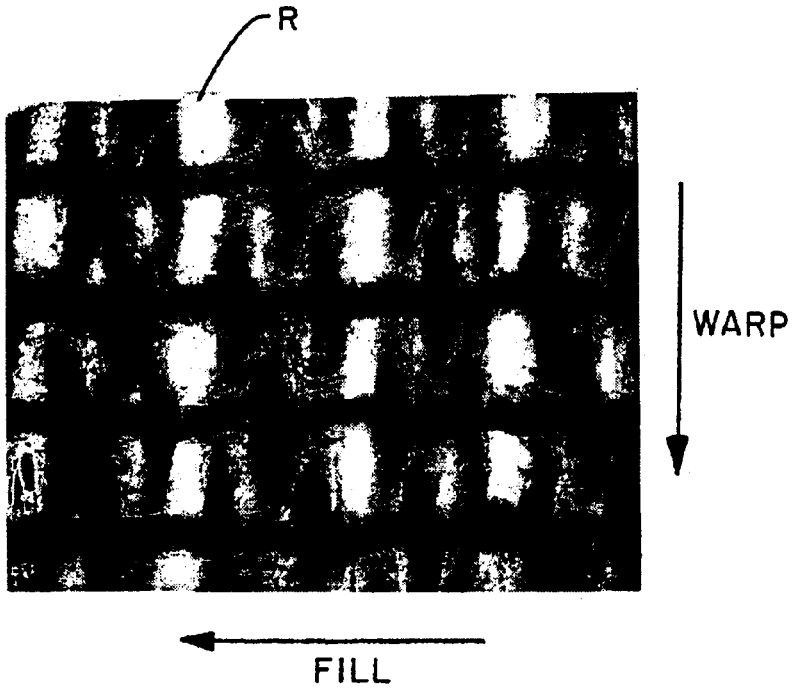
FIGS. 4A and B are photomicrographs at 16× magnification of the control and processed fabric of FIGS. 3A and B.

Conventional weaving processes impart reed marks to fabrics. Illustrations of such markings are shown in FIGS. 3A and 4A which are photomicrographs at 10× and 16× magnification of a polyester LIBBEY brand fabric style no. S/x-A805 (see Table II). Reed marks in FIGS. 3A and 4A are designated by the letter "R".

The invention overcomes this defect in conventional weaving processes through use of a single and preferably two stage hydroenhancement process. Advantage is obtained in the invention process by orienting the drum support member 34 in offset relation, preferably 45°, relative to machine direction ("MD") of the hydroenhancing line. See FIGS. 2A and B.

Support members 22 and 34 are preferably provided with fine mesh open areas which are dimensioned to effect fluid passage through the members without imparting a patterned effect to the fabric. The preferred members have an effective open area for fluid passage in the range of 17–40%.

Comparison of the control and processed polyester fabric of FIGS. 3A, B and 4A, B illustrates the advantages obtained through use of the enhancement process. Reed marks R in control polyester fabric are essentially eliminated through enhancement of the fabric. The offset screen arrangement is also effective in diminishing linear jet streak markings associated with the enhancement process.

EXAMPLES I–XIII

FIGS. 3–15 illustrate representative woven and knit fabrics enhanced in accordance with the method of the invention, employing test conditions which simulate the line of FIG. 1. Table II sets forth specifications for the fabrics illustrated in the drawings.

As in the FIG. 1 line, the test manifolds 30 were spaced approximately 8 inches apart in modules 16, 18, and provided with densely packed columnar jet orifices 32 of approximately 60/inch. Orifices 32 each had a diameter of 0.005 inches and were spaced approximately 0.5 inches from the first and second support members 22, 34.

The process line of FIG. 1 includes enhancement modules 16, 18 which, respectively, are provided with six manifolds. In the Examples, modules 16, 18 were each fitted with two manifolds 34. To simulate line conditions, the fabrics were advanced through multiple runs on the line. Three processing runs in each two manifold module was deemed to be equivalent to a six manifold module.

Fabrics were hydroenhanced at process pressures of approximately 1500 psi. Line speed and cumulative energy output of the modules were respectively maintained at approximately 30 fpm and 0.46 hp-hr/lb. Adjustments in the line speed and fluid pressure were made to accommodate differences in fabric weight for uniform processing and to maintain the preferred energy level.

Fabrics processed in the Examples exhibited marked enhancement in aesthetic appearance and quality including, characteristics such as cover, bloom, abrasion resistance, drape, stability, and reduction in seam slippage, and edge fray.

Tables III–XI set forth data for fabrics enhanced in accordance with invention on the test process line. Standard testing procedures of The American Society for Testing and Materials (ASTM) were employed to test control and processed characteristics of fabrics. Data set forth in the Tables was generated in accordance with the following ASTM standards:

| Fabric Characteristic | ASTM Standard |
|---|---|
| Weight | D3776-79 |
| Thickness | D1777-64 (Ames Tester) |
| Tensile Load | D1682-64 (1975) (Cut strip/grab) |
| Elongation | D1682-64 (1975) |
| Air Permeability | D737-75 (1980) (Frazier) |
| Thread Count | D3775-79 |
| Ball Burst | D3787-80A |
| Seam Slippage | D4159-82 |
| Tongue Tear | D2261-71 |
| Wrinkle Recovery | D1295-67 (1972) |
| Abrasion Resistance | D3884-80 |
| Pilling | D3514-81 |

Washability tests were conducted in accordance with the following procedure. Weight measurements ("before wash") were taken of control and processed fabric samples each having a dimension of 8.5×11" (8.5" fill direction and 11" warp direction). The samples were then washed and dried in conventional washer and dryers three consecutive times and "after wash" measurements were taken. The percent weight loss of the pre and post wash samples was determined in accordance the following formula:

$$\% \text{ weight loss} = D/B \times 100$$

where, B=before wash sample weight; A=after wash sample weight; and D=B−A.

Photomicrographs of the fabrics, FIGS. 4–15, illustrate the enhancement in fabric cover obtained in the invention. Attention is directed to open areas in the unprocessed fabrics, photographs designated A, these areas are of reduced size in the processed fabrics in the photographs designated B. Hydroenhancement caused fabric yarns to bloom and entangle at cross-over points, filling in open areas to improve cover and reduce air permeability in the fabrics.

Figure 12A:
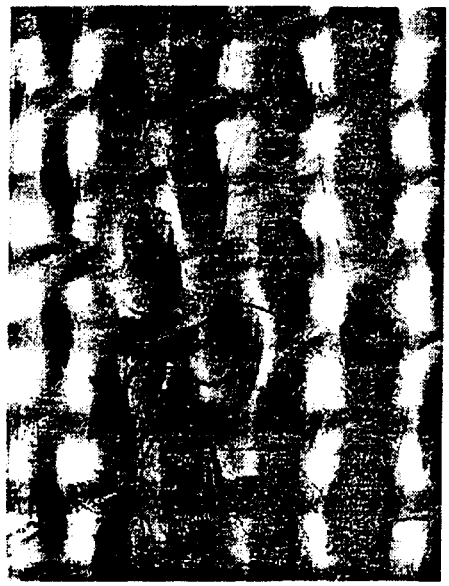
FIGS. 12A and B are front and back side photomicrographs at 16× magnification of a control wall covering fabric.
Figure 12B:
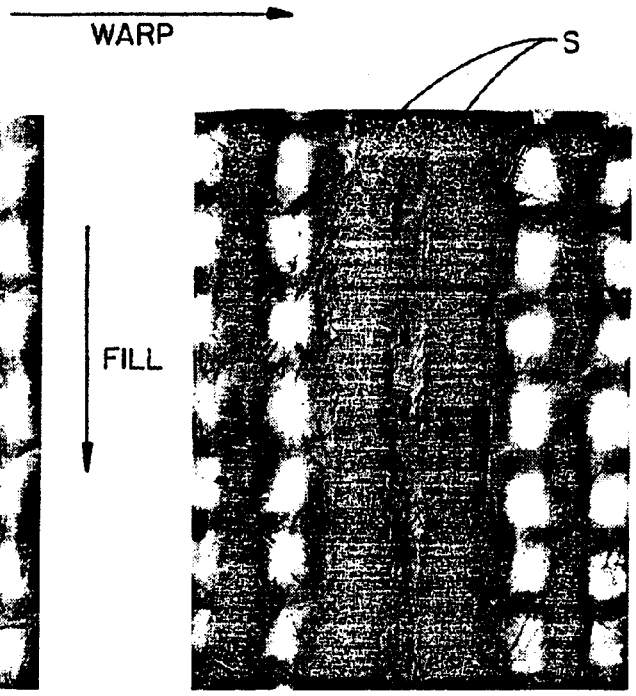
Figure 13A:
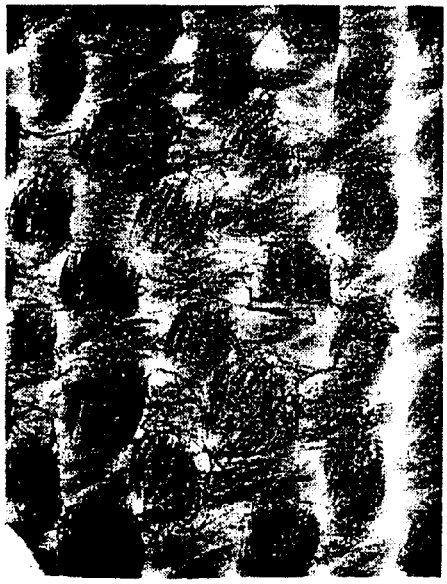
FIGS. 13A and B are front and back side photomicrographs at 16× magnification of the wall covering fabric of FIGS. 12A and B hydroenhanced in accordance with the invention.
Figure 13B:
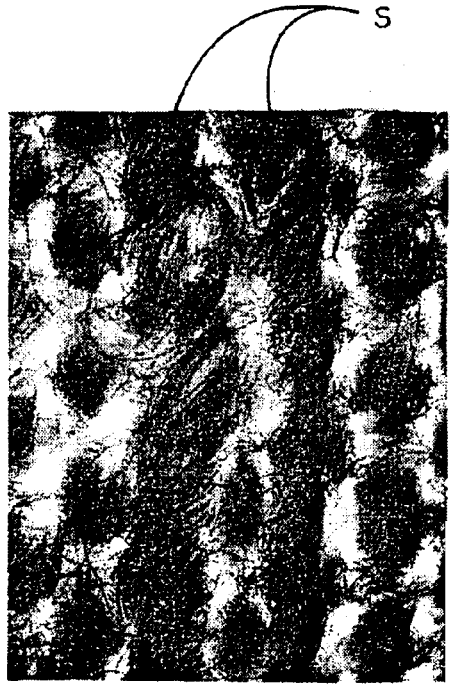

FIGS. 12 and 13 are photomicrographs of a HYTEX brand wall covering fabric, manufactured by Hytex, Inc., Randolph, Mass. A multi-textured surface appearance of the fabric is provided by yarns which are woven through discrete areas of the front fabric surface. Free floating weave stitches, designated by the letter "S" in FIGS. 12B and 13B, are formed on the backside of the fabric.

Hydroenhancement of HYTEX wall covering fabric secured the free-floating stitches S to the fabric backside enhancing fabric stability and cover. See FIGS. 12B, 13B. In wall covering applications, fabric enhancement and associated stabilizing effects reduces or eliminates the need for adhesive backcoatings. Enhancement of the fabric also limits wicking of wall cover application adhesives through the fabric. Further advantage is obtained when enhanced fabrics are used in acoustic applications; elimination of backcoating reduces sound reflection and furthers efficient transmission of sound through the fabric.

TABLE II

Fabric Specifications

| Fiber Brand and Style Designation | Figure (s) |
|---|---|
| NOMEX S/x-A805* | 3 A,B, 4 A,B |
| Fiber: 2 denier - 1.9 inch | |
| Yarn: Open end cotton spun 17s | |
| LIBBEY S/022** | 5 A,B |
| Warp: | |
| Fiber: 3 denier - 1.5 inch acrylic | |
| Yarn: Open end cotton spun 9s | |
| 28 ends per inch | |
| Fill: | |
| Fiber: 3 denier - 3 inch acrylic | |
| Yarn: Open end wool spun 4s | |
| 14, 16 or 18 picks per inch | |
| LIBBEY S/x-1160 | 6 A,B |
| Fiber: 3 denier - 3 inch acrylic | |
| Yarn: Wrap spun w/100 den textured polyester 4s | |
| 14 ends × 16 picks per inch | |
| LIBBEY S/406 | 7 A,B, 14 A,B |
| Warp: | |
| Fiber: 3 denier - 1.5 inch acrylic | |
| Yarn: Open end cotton spun 9s | |
| 28 ends per inch | |
| Fill: | |
| Fiber: 3 denier - 3 inch acrylic | |
| Yarn: Hollow spun 6 twists/inch 4s | |
| 14, 16 or 18 picks per inch | |
| LIBBEY S/152 | 8 A,B |
| Warp: | |
| Fiber: 3 denier - 2.5 inch acrylic | |
| Yarn: Open end cotton spun 4s | |
| 14 ends per inch | |
| Fill: | |
| Fiber: 3 denier - 3 inch acrylic | |
| Yarn: Open end wool spun 2.6s | |
| 14, 16 or 18 picks per inch | |
| Guilford Wool/Nylon | 9 A,B |
| 80% wool/20% nylon | |
| Polyester/cotton (53/47) | 10 A,B |
| Weight: 10 ounces/yd$^2$ | |
| Yarn: Spun Filament | |
| Weave: 3 × 1 Twill | |
| Thread Count: 120 × 38 | |
| 50% Polyester/50% cotton Doubleknit | 11 A,B |
| Yarn: warp spun with 100 denier polyester wrap | |
| HYTEX Wall covering*** | 12, 13 |

*LIBBEY is a trademark of W. S. Libbey Co., One Mill Street, Lewistown, ME 04240.
**NOMEX is a trademark of E. I. Du Pont de Nemours and Company, Wilmington, Del.
***HYTEX is a trademark of Hytex, Inc. Randolph, MA.

TABLE III

Figure 4B:
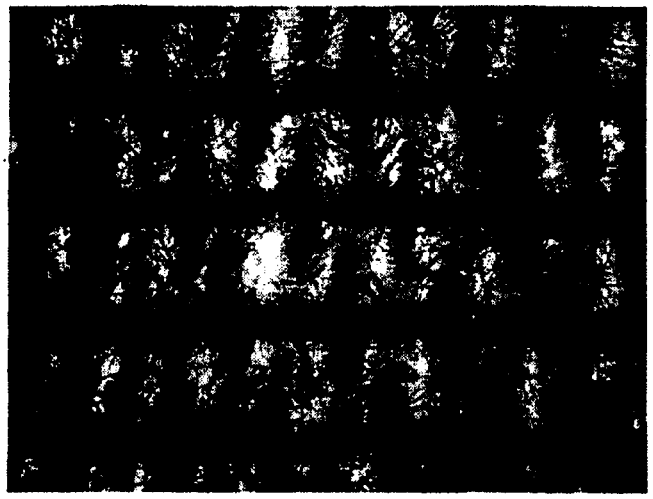

| Nomex A805 - FIG. 4 | Control | Processed | % Chance |
|---|---|---|---|
| Weight (gsy) | 195 | 197 | +1.0 |
| Thickness (mils) | 42 | 42 | 0 |
| Air Perm. ($ft^3/ft^2$/min) | 331 | 156 | −52.9 |
| Strip Tensile (lbs/in) | | | |
| warp | 115 | 132 | +14.8 |
| fill | 59 | 47 | −20.3 |
| Elongation % | | | |
| warp | 48 | 50 | +4.2 |
| fill | 62 | 71 | +14.5 |

TABLE IV

Figure 5A:
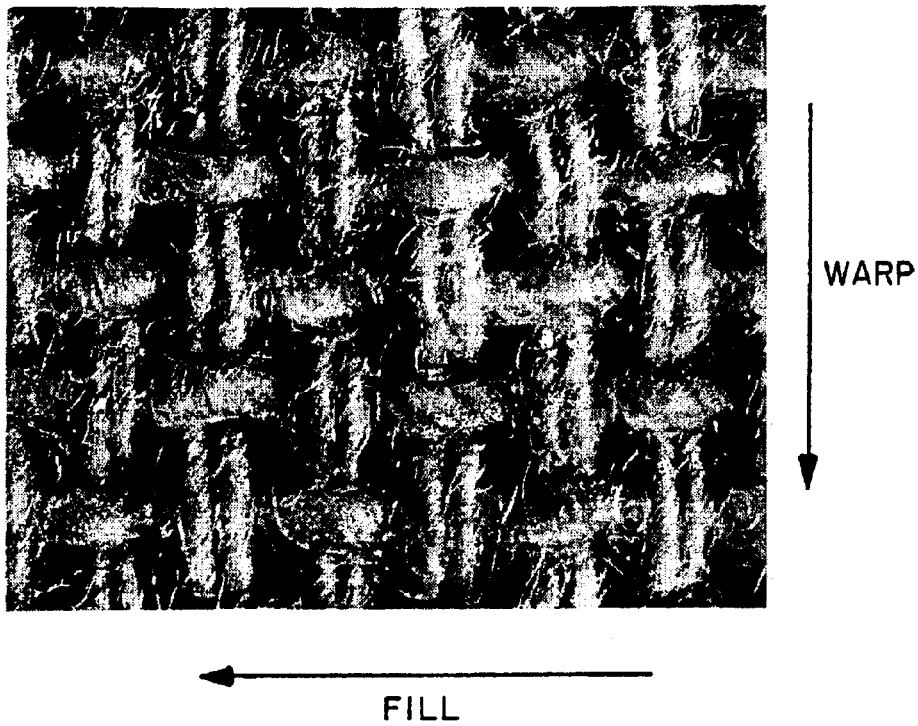
FIGS. 5A and B are photomicrographs at 10× magnification of a control and hydroenhanced woven acrylic fabric.
Figure 5B:
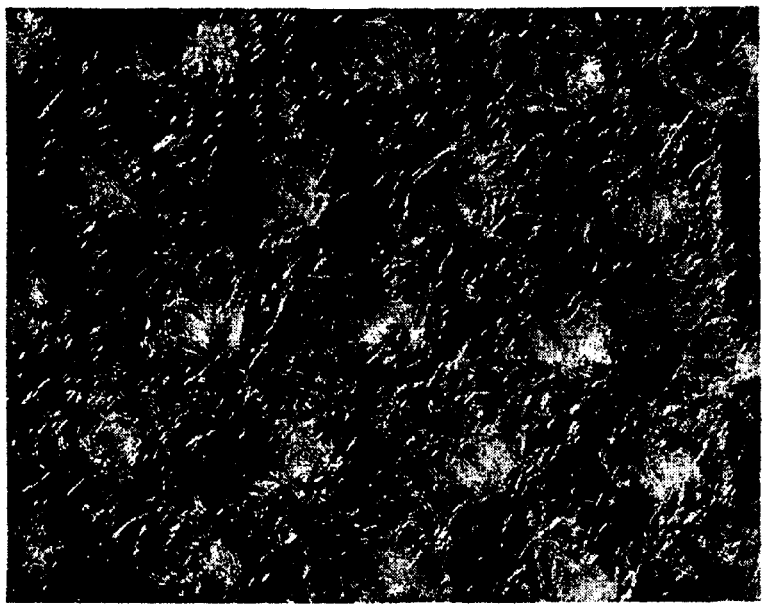

| 022/6075 (16 ppi) - FIG. 5 | Control | Processed | % Change |
|---|---|---|---|
| Weight (gsy) | 158 | 165 | +4.4 |
| Thickness (mils) | 48 | 49 | +2.1 |
| Air Perm. ($ft^3/ft^2$ min) | 406 | 259 | −36.2 |
| Strip Tensile (lbs/in) | | | |
| warp | 34 | 36 | +5.9 |
| fill | 37 | 31 | −16.2 |
| Elongation (%) | | | |
| warp | 33 | 27 | −18.2 |
| fill | 27 | 28 | +3.7 |
| Seam Slippage (lbs/in) | | | |
| warp | 5 | 60 | +1100.0 |
| fill | 7 | 55 | +685.7 |
| Tongue Tear (lbs) | | | |
| warp | 18 | 10 | −44.4 |
| fill | 21 | 8 | −61.9 |
| Wt. Loss In Wash (%) | 37 | 5 | −86.5 |
| Wrinkle Recovery* (recovery angle) | 123* | 138* | +12.2 |

*Under ASTM test standards (D1295-67) improvements in the wrinkle recovery of a fabric are indicated by an increase in the recovery angle.

TABLE V

Figure 6A:
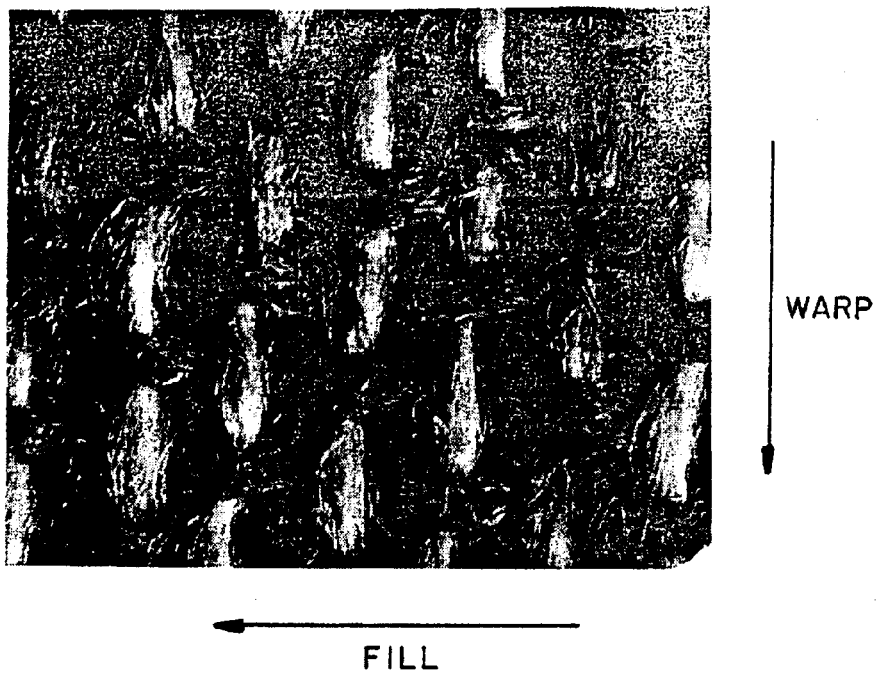
FIGS. 6A and B are photomicrographs at 10× magnification of a control and hydroenhanced acrylic fabric woven of wrap spun yarn.
Figure 6B:
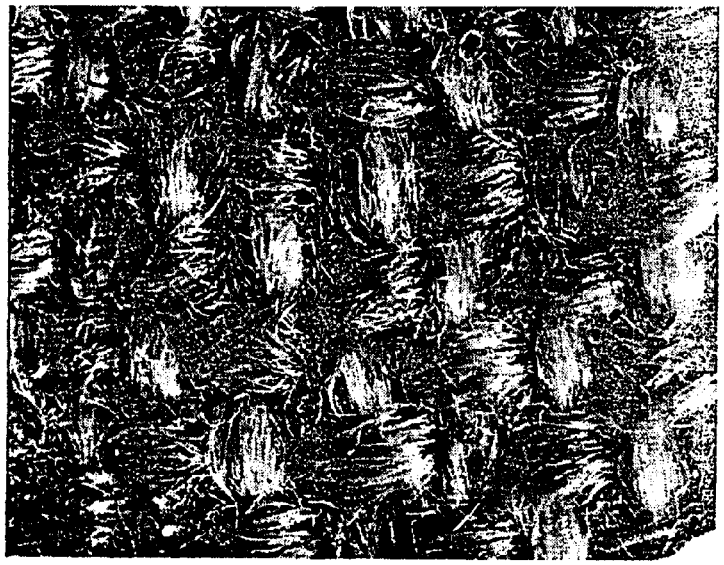

| LIBBEY S/x-1160 - FIG. 6 | Control | Processed | % Change |
|---|---|---|---|
| Weight (gsy) | 146.8 | 160.2 | 9.1 |
| Thickness (mils) | 38.1 | 52.7 | 38.3 |
| Air Perm. ($ft^3/ft^2$ min) | 457.2 | 188.5 | −58.8 |
| Grab Tensile (lbs/in) | | | |
| warp | 80.2 | 89.3 | 11.4 |
| fill | 105.0 | 111.4 | 6.1 |
| Elongation (%) | | | |
| warp | 30.0 | 34.0 | 13.3 |
| fill | 32.0 | 46.0 | 43.8 |
| Ball Burst (lbs) | 190 | 157 | −17.4 |

TABLE VI

Figure 7A:
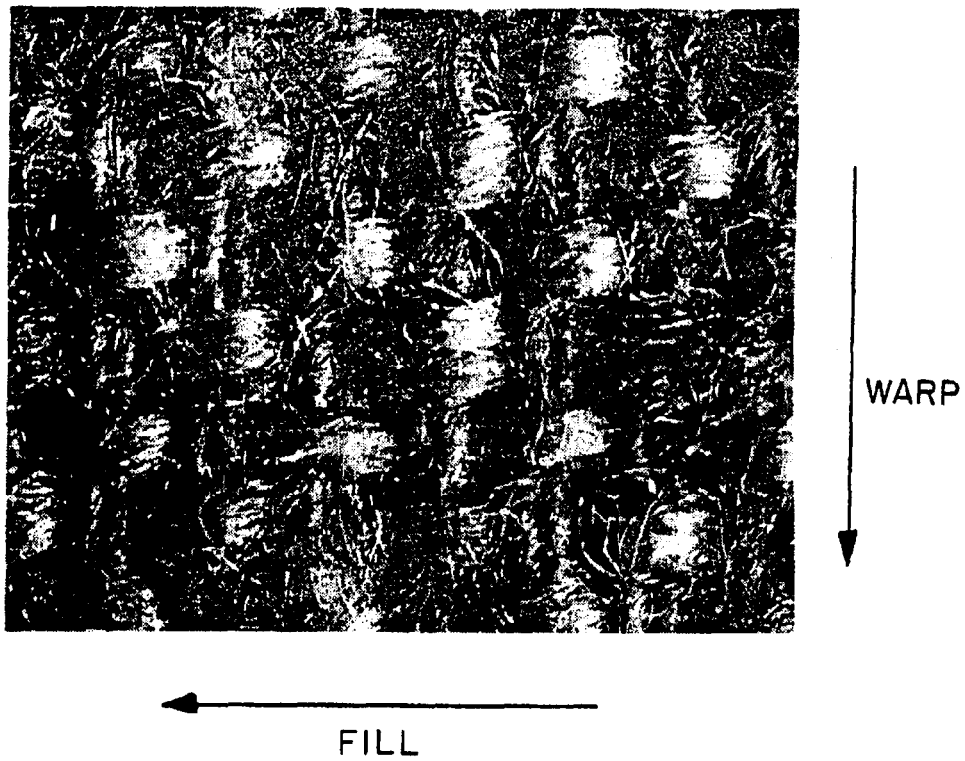
FIGS. 7A and B are photomicrographs at 10× magnification of a control and hydroenhanced acrylic fabric woven of wrap spun yarn.
Figure 7B:
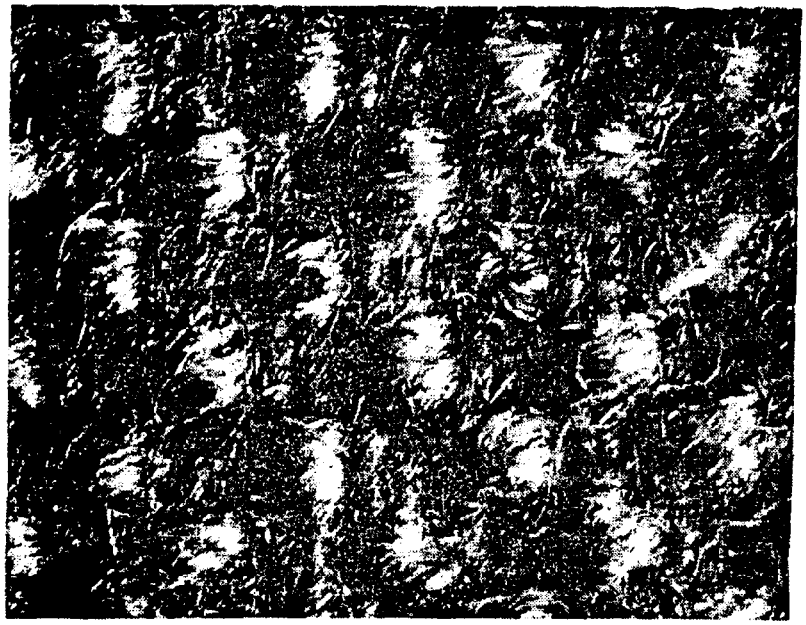

| 406/6075 (16 ppi) - FIG. 7 | Control | Processed | % Change |
|---|---|---|---|
| Weight (gsy) | 159 | 166 | +4.4 |
| Thickness (mils) | 48 | 50 | +4.2 |
| Air Perm. ($ft^3/ft^2$ min) | 351 | 184 | −47.6 |
| Strip Tensile (lbs/in) | | | |
| warp | 42 | 36 | −14.3 |
| fill | 66 | 58 | −12.1 |
| Elongation (%) | | | |
| warp | 23 | 31 | +34.8 |
| fill | 49 | 33 | −32.7 |
| Seam Slippage (lbs) | | | |
| warp | 29 | 36 | +89.5 |
| fill | 21 | 76 | +261.9 |
| Tongue Tear (lbs) | | | |
| warp | 23 | 18 | −21.7 |
| fill | 19 | 15 | −1.1 |
| Wt. Loss In Wash (%) | 28 | 4 | −85.7 |
| Wrinkle Recovery (recovery angle) | 140* | 148* | +5.7 |

TABLE VII

Figure 8A:
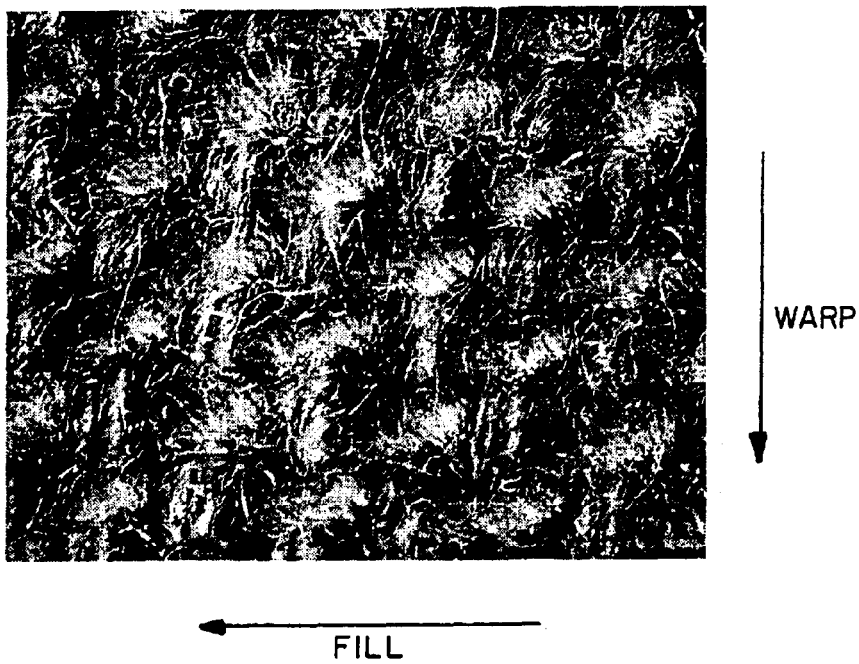
FIGS. 8A and B are photomicrographs at 10× magnification of a control and hydroenhanced acrylic fabric including open end wool spun yarn.
Figure 8B:
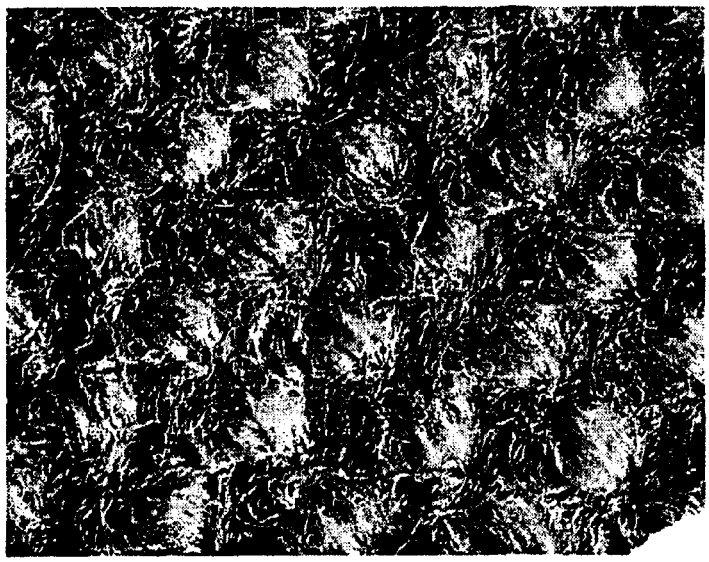

| 152/6076 (16 ppi) - FIG. 8 | Control | Processed | % Change |
|---|---|---|---|
| Weight (gsy) | 231 | 257 | +11.3 |
| Thickness (mils) | 259 | 238 | −8.1 |
| Air Perm. ($ft^3/ft^2$/min) | 204 | 106 | −48.0 |
| Strip Tensile (lbs/in) | | | |
| warp | 48 | 58 | +20.8 |
| fill | 56 | 72 | +28.6 |
| Elongation (%) | | | |
| warp | 33 | 33 | 0 |
| fill | 34 | 39 | +14.7 |
| Seam Slippage (lbs) | | | |
| warp | 64 | 81 | +26.6 |
| fill | 78 | 112 | +43.6 |
| Tongue Tear (lbs) | | | |
| warp | 21 | 18 | −14.3 |
| fill | 17 | 15 | −11.8 |
| Wt. Loss In Wash (%) | — | — | — |
| Wrinkle Recovery (recovery angle) | 117* | 136* | +16.2 |

TABLE VIII

Figure 9A:
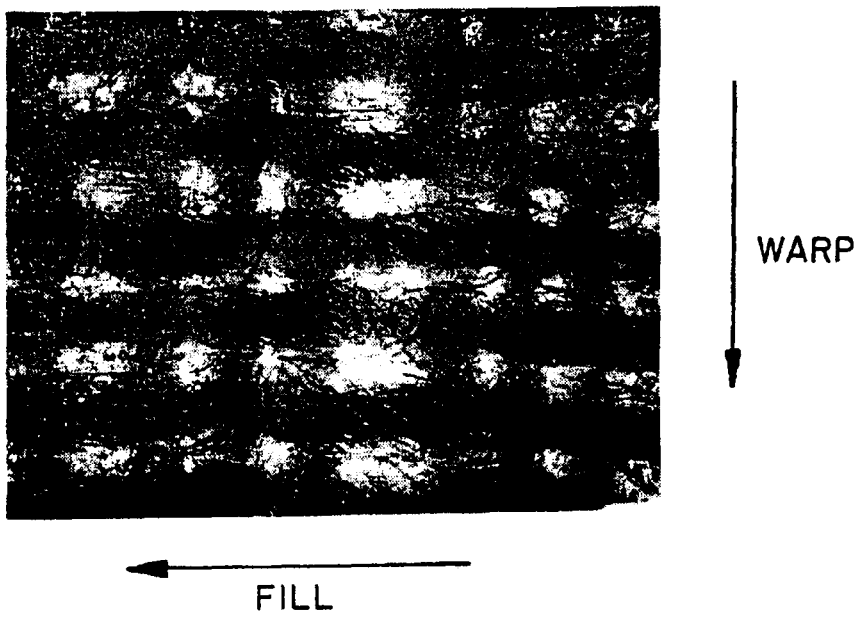
FIGS. 9A and B are photomicrographs at 16× magnification of a control and hydroenhanced wool nylon (80/20%) fabric.
Figure 9B:
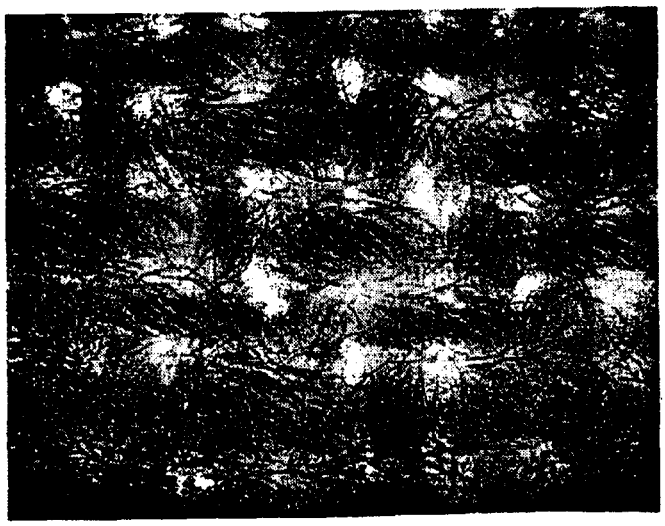

| Guilford Wool (80% wool/20% nylon) - FIG. 9 | Control | Processed | % Change |
|---|---|---|---|
| Air Perm. | 243 | 147 | −39.5 |

TABLE IXA

Figure 10A:
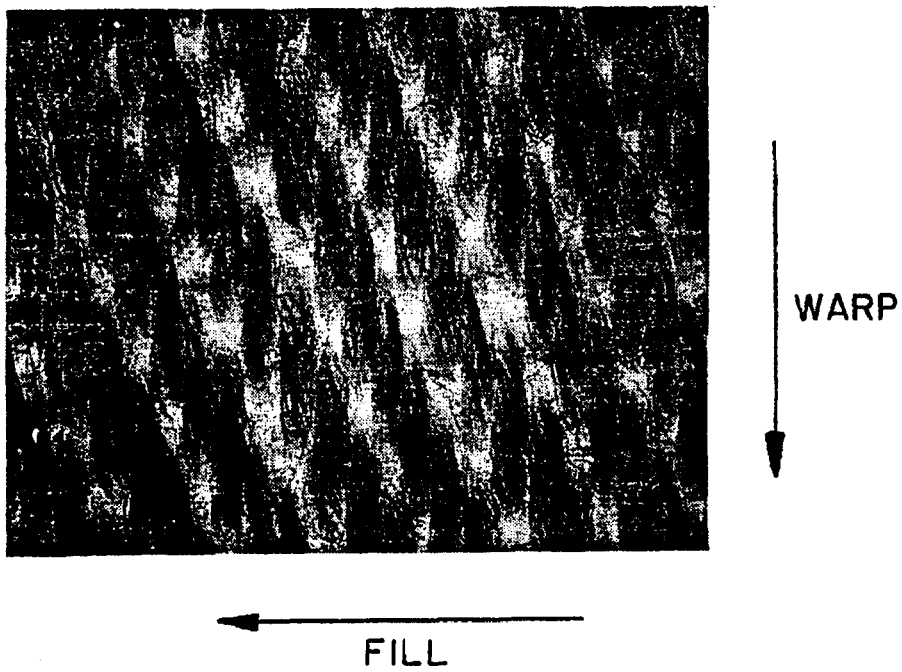
FIGS. 10A and B are photomicrographs at 16× magnification of a control and hydroenhanced spun/filament polyester/cotton twill fabric.
Figure 10B:
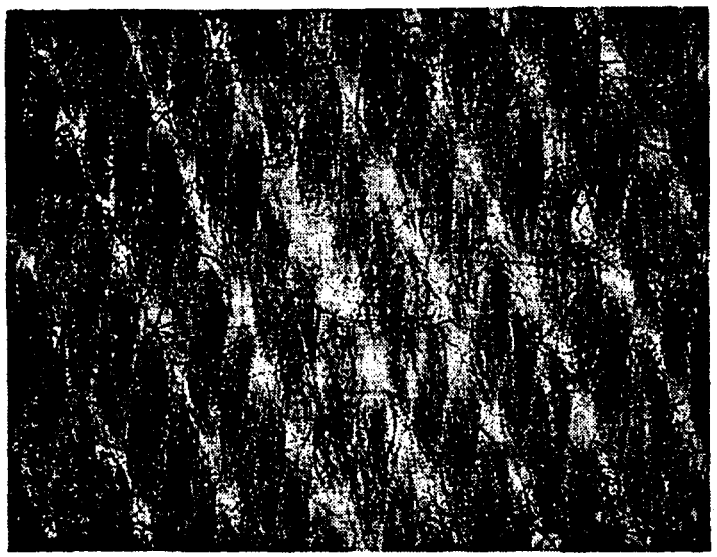

| Spun/Filament - Bottom Weights - FIG. 10 | Sample #1 | | Sample #2 | | Sample #3 | | Sample #4 | |
|---|---|---|---|---|---|---|---|---|
| | Control | Proc | Control | Proc | Control | Proc | Control | Proc |
| Weight (gsy) | 259.2 | 275.4 | 240.3 | 248.4 | 286.2 | 297.2 | 267.3 | 280.8 |
| Thickness (mils) | 39.7 | 39.2 | 35.0 | 35.3 | 44.2 | 41.5 | 40.0 | 38.0 |
| Strip Tensiles (lbs./in.) | | | | | | | | |
| Warp | 206.98 | 208.87 | 195.90 | 200.86 | 183.09 | 189.95 | 206.43 | 207.87 |
| Fill | 85.55 | 56.23 | 84.21 | 71.83 | 80.88 | 83.01 | 80.16 | 82.14 |
| Normalized Tensiles (lbs./in.) | | | | | | | | |
| Warp | 7.98 | 7.58 | 8.05 | 8.09 | 6.40 | 6.39 | 7.65 | 7.40 |
| Fill | 3.30 | 2.04 | 3.54 | 2.89 | 2.83 | 2.79 | 3.03 | 2.93 |
| Elongation (%) | | | | | | | | |
| Warp | 42.0 | 55.3 | 36.5 | 39.1 | 40.9 | 43.5 | 46.1 | 51.2 |
| Fill | 23.6 | 25.6 | 24.0 | 20.0 | 23.5 | 20.3 | 22.9 | 22.4 |
| Air Perm. ($ft.^3/ft.^2/min$) | 50.9 | 27.3 | 43.5 | 28.8 | 45.8 | 21.8 | 51.4 | 25.4 |
| Thread Count (wxf) | 120 × 40 | 120 × 41 | 120 × 45 | 120 × 45 | 120 × 38 | 120 × 42 | 120 × 42 | 120 × 43 |
| Mullen Burst (lbs.) | 161.2 | 222.2 | 187.2 | 228.8 | 161.0 | 217.8 | 205.0 | 242.2 |
| Normalized Burst (lbs./g × $10^2$) | 62.2 | 80.7 | 77.9 | 92.1 | 56.2 | 73.3 | 76.7 | 86.3 |

TABLE IXB

| Abrasion - Spun Filament-Bottom Weights - FIG. 10 ASTM Standard - Twill side up; 500 cycles; 500 g weight; H-18 wheels | | | | | |
|---|---|---|---|---|---|
| Sample | Weight Before (g) | Weight After (g) | Weight Loss (g) | % Loss | % Improvement |
| 1C | 3.32 | 3.02 | 0.30 | 9.0 | 23% |
| 1P | 3.36 | 3.13 | 0.23 | 6.9 | |
| 2C | 4.64 | 4.16 | 0.48 | 10.4 | 48% |
| 2P | 4.83 | 4.57 | 0.26 | 5.4 | |
| 3C | 4.73 | 4.47 | 0.26 | 5.5 | 18% |
| 3P | 4.91 | 5.13 | 0.22 | 4.5 | |
| 4C | 4.47 | 4.18 | 0.29 | 6.5 | 41% |
| 4P | 4.71 | 4.53 | 0.18 | 3.8 | |

TABLE X

Figure 11A:
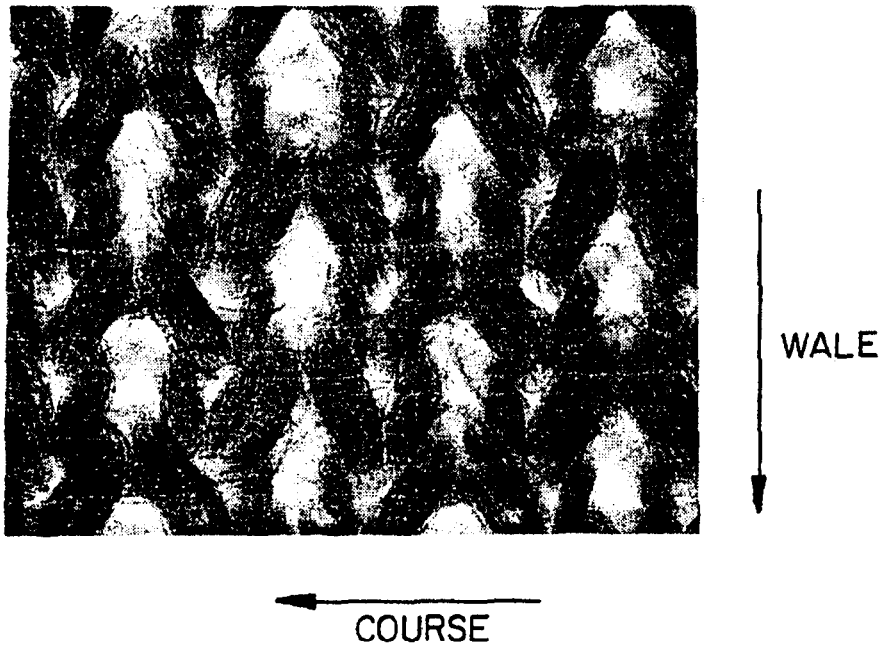
FIGS. 11A and B are photomicrographs at 16× magnification of a control and hydroenhanced doubleknit fabric.
Figure 11B:
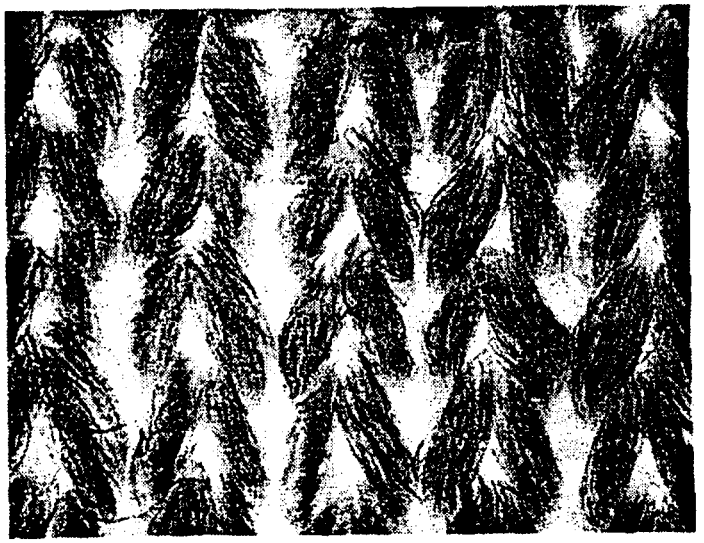

| Doubleknit - FIG. 11 | Control | Processed | % Change |
|---|---|---|---|
| Air Perm. ($Ft^3/ft^2$ min) | 113.1 | 95.1 | −15.9 |
| Abrasion ASTM (D-3884-80); 250 Cycles, H-18 wheel | 1.0 | 0.6 | −40.0 |
| Pilling (1-5 rating) ASTM (D-3914-81); 300 cycles | 4.3 | 4.3 | 0 |

Figure 14A:
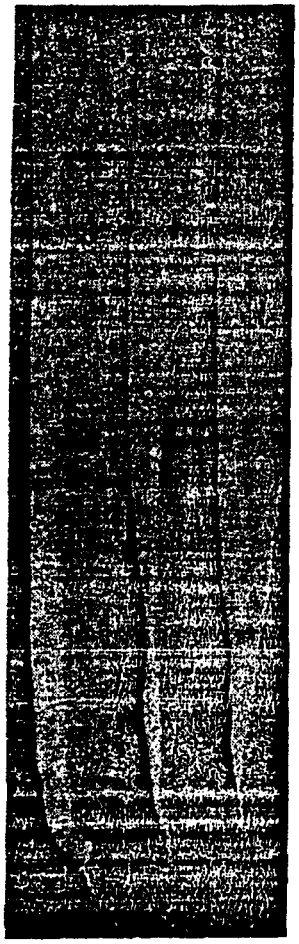
FIG. 14 is a photomacrograph at 0.09× magnification of a control and hydroenhanced acrylic fabric strips, the fabric of FIGS. 7A and B, showing the reduction in fabric torque achieved in the invention process.
Figure 14B:
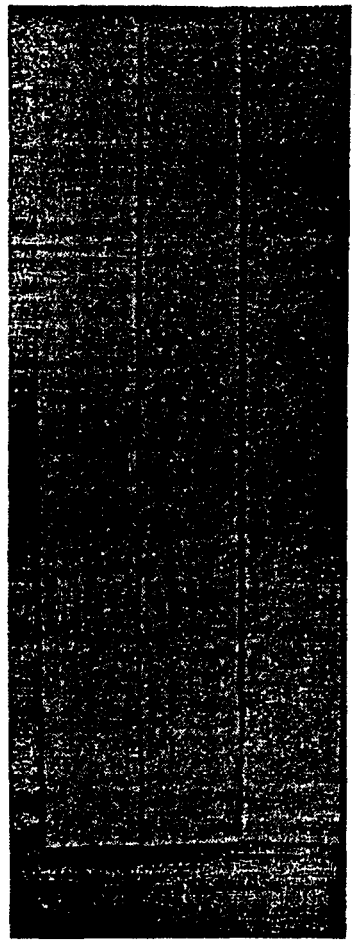

FIGS. 14A, B are photomacrographs of control and processed acrylic vertical blind fabric, manufactured by W. S. Libbey, style designation S/406. Enhancement of the fabric reduces fabric torque which is particularly advantageous in vertical blind applications. The torque reduction test of FIGS. 14A, B employed fabric strips 84" long and 3.5" wide, which were suspended vertically without restraint. Torque was measured with reference to the angle of fabric twist from a flat support surface. As can be seen in the photographs, a torque of 90° in the unprocessed fabric, FIG. 14A, was eliminated in the enhancement process.

Figure 15A:
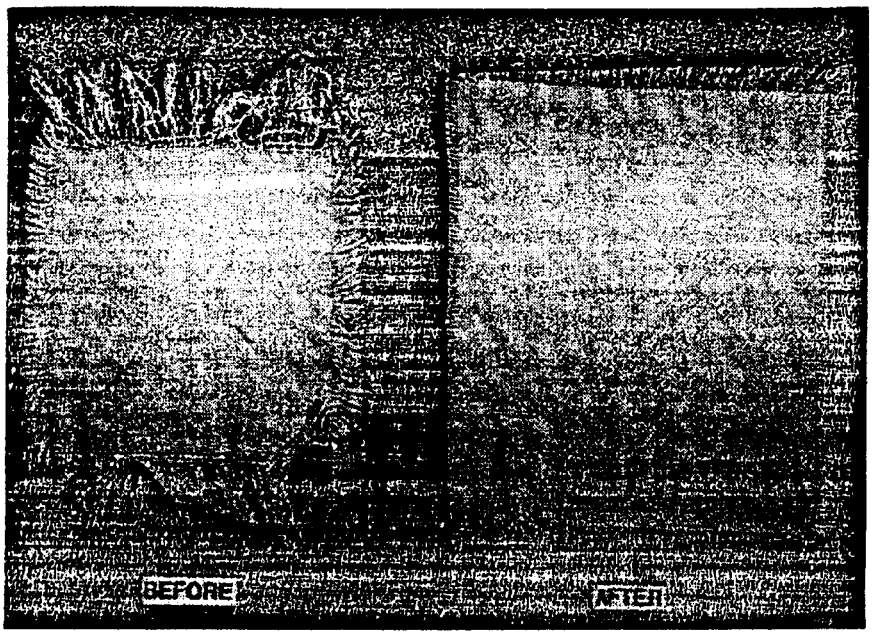
FIGS. 15A–C are photomacrographs at 0.23× magnification, respectively, of the woven acrylic fabrics of FIGS. 5, 7 and 8, comprised of wrap spun and open end wool spun yarns, showing washability and wrinkle characteristics of control and processed fabrics.
Figure 15B:
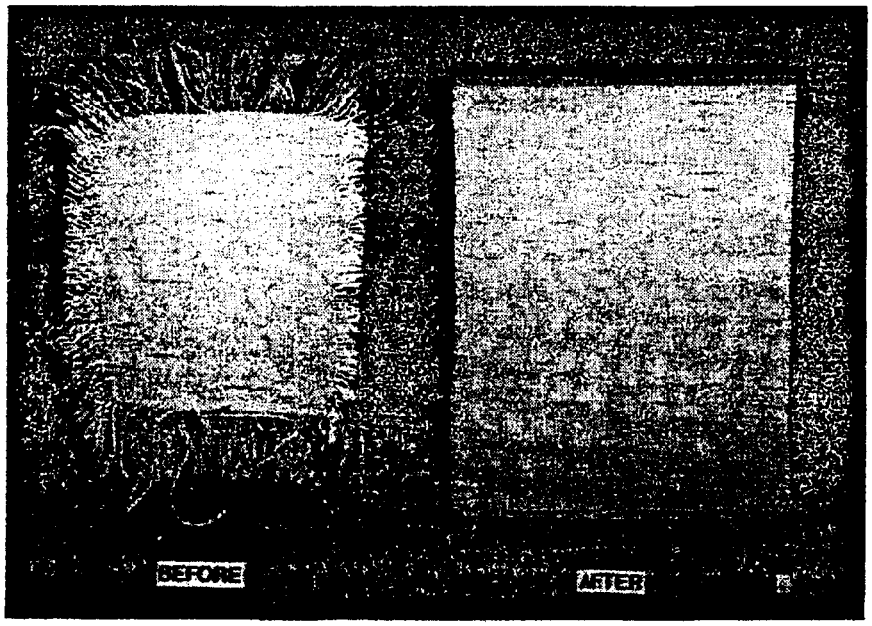
Figure 15C:
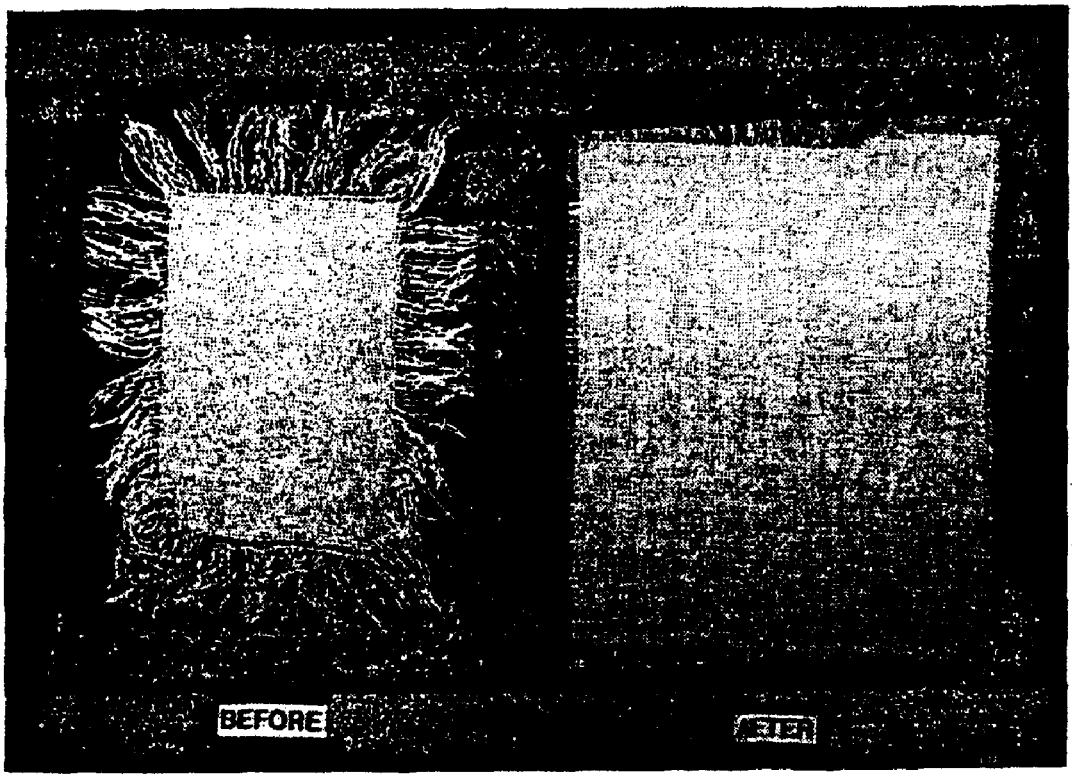

FIGS. 15A–C are macrophotographs of control and processed acrylic fabrics, LIBBEY style nos. 022, 406 and 152, respectively, which were tested for washability. Unprocessed fabrics exhibited excessive fraying and destruction, in contrast to the enhanced fabrics which exhibit limited fraying and yarn (weight) loss. Table XI sets forth washability test weight loss data.

TABLE XI

| 022, 406, 152 - FIGS. 15 A-C Percent Weight Loss (3 wash/dry cycles) | | |
|---|---|---|
| Sample | Control | Processed |
| 022 | 36.5 | 5.0 |
| 406 | 28.0 | 4.0 |
| 152 | 28.1 | 7.2 |

Figure 16:
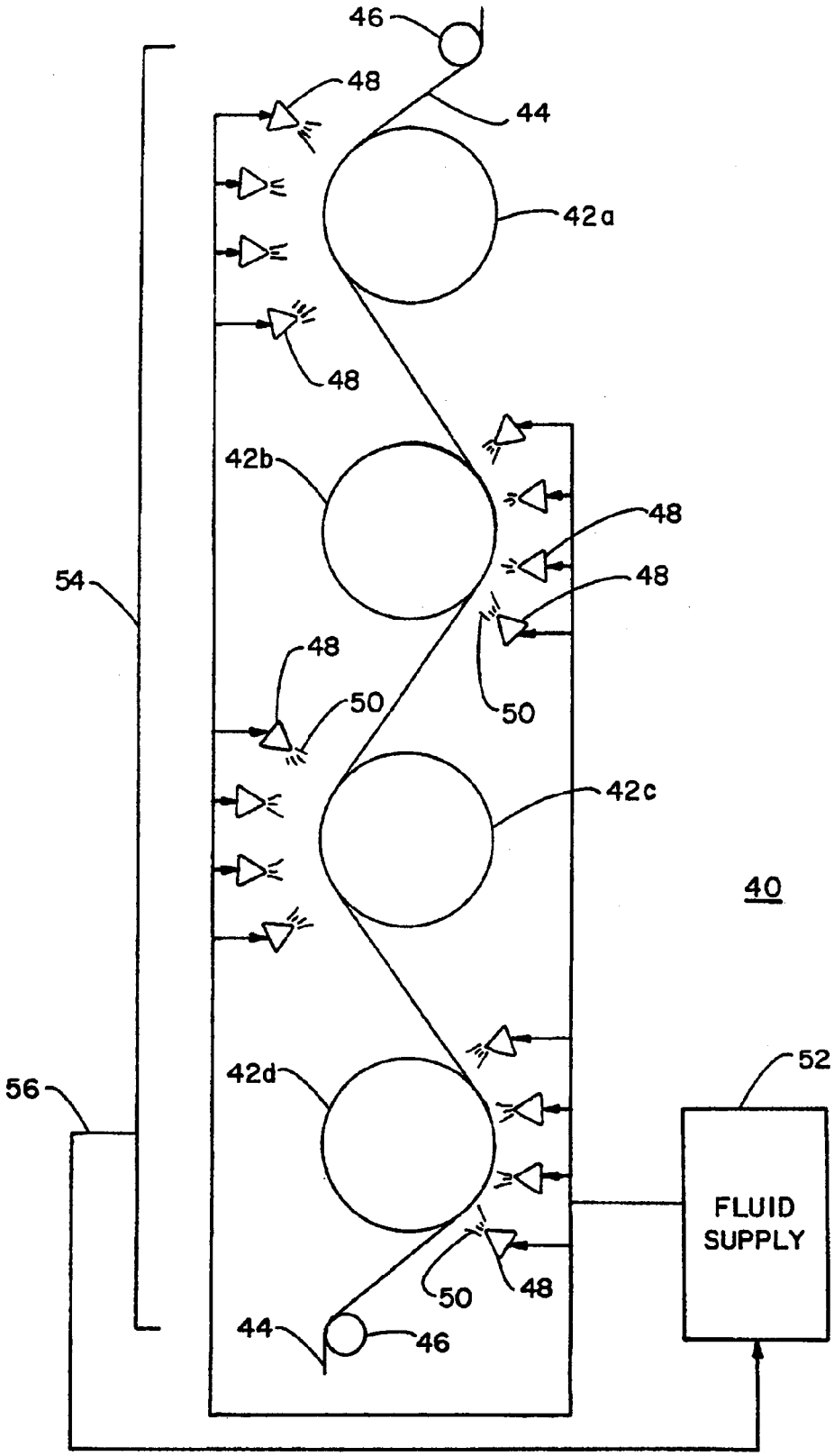
FIG. 16 is a schematic view of an alternative production line apparatus for the hydroenhancement of woven and knit fabrics in accordance with the invention.

FIG. 16 illustrates an alternative embodiment of the invention apparatus, generally designated 40. The apparatus includes a plurality of drums 42a–d over which a fabric 44 is advanced for enhancement processing. Specifically, the fabric 44 traverses the line in a sinuous path under and over the drums 42 in succession. Rollers 46a and b are provided at opposite ends of the line adjacent drums 42a and d to support the fabric. Any or all of the drums can be rotated by a suitable motor drive (not shown) to advance the fabric on the line.

A plurality of manifolds 48 are provided in groups, FIG. 16 illustrates groups of four, which are respectively spaced from each of the drums 42a–d. An arrangement of manifold groups at 90° intervals on the sinuous fabric path successively positions the manifolds in spaced relation with respect to opposing surfaces of the fabric. Each manifold 40 impinges columnar fluid jets 50, such as water, against the fabric. Fluid supply 52 supplies fluid to the manifolds 48 which is collected in liquid sump 54 during processing for recirculation via line 56 to the manifolds.

The support drums 42 may be porous or non-porous. It will be recognized that advantage is obtained through use of drums which include perforated support surfaces. Open areas in the support surfaces facilitate recirculation of the fluid employed in the enhancement process.

Further advantage is obtained, as previously set forth in discussion of the first embodiment, through use of support surfaces having a fine mesh open area pattern which facilitates fluid passage. Offset arrangement of the support member orientations, for example at 45° offset orientation as shown in FIG. 2, limits process water streak and weave reed marks in the enhanced fabric.

Enhancement is a function of energy which is imparted to the fabric. Preferred energy levels for enhancement in accordance with the invention are in the range of 0.1 to 2.0 hp-hr/lb. Variables which determine process energy levels include line speed, the amount and velocity of liquid which impinges on the fabric, and fabric weight and characteristics.

Fluid velocity and pressure are determined in part by the characteristics of the fluid orifices, for example, columnar versus fan jet configuration, and arrangement and spacing from the process line. It is a feature of the invention to impinge a curtain of fluid on a process line to impart an energy flux of approximately 0.46 hp-hr/lb to the fabric. Preferred specifications for orifice type and arrangement are set forth in description of the embodiment of FIG. 1. Briefly, orifices 16 are closely spaced with center-to-center spacings of approximately 0.017 inches and are spaced 0.5 inches from the support members. Orifice diameters of 0.005 inches and densities of 60 per manifold inch eject columnar fluid jets which form a uniform fluid curtain.

Figure 17:
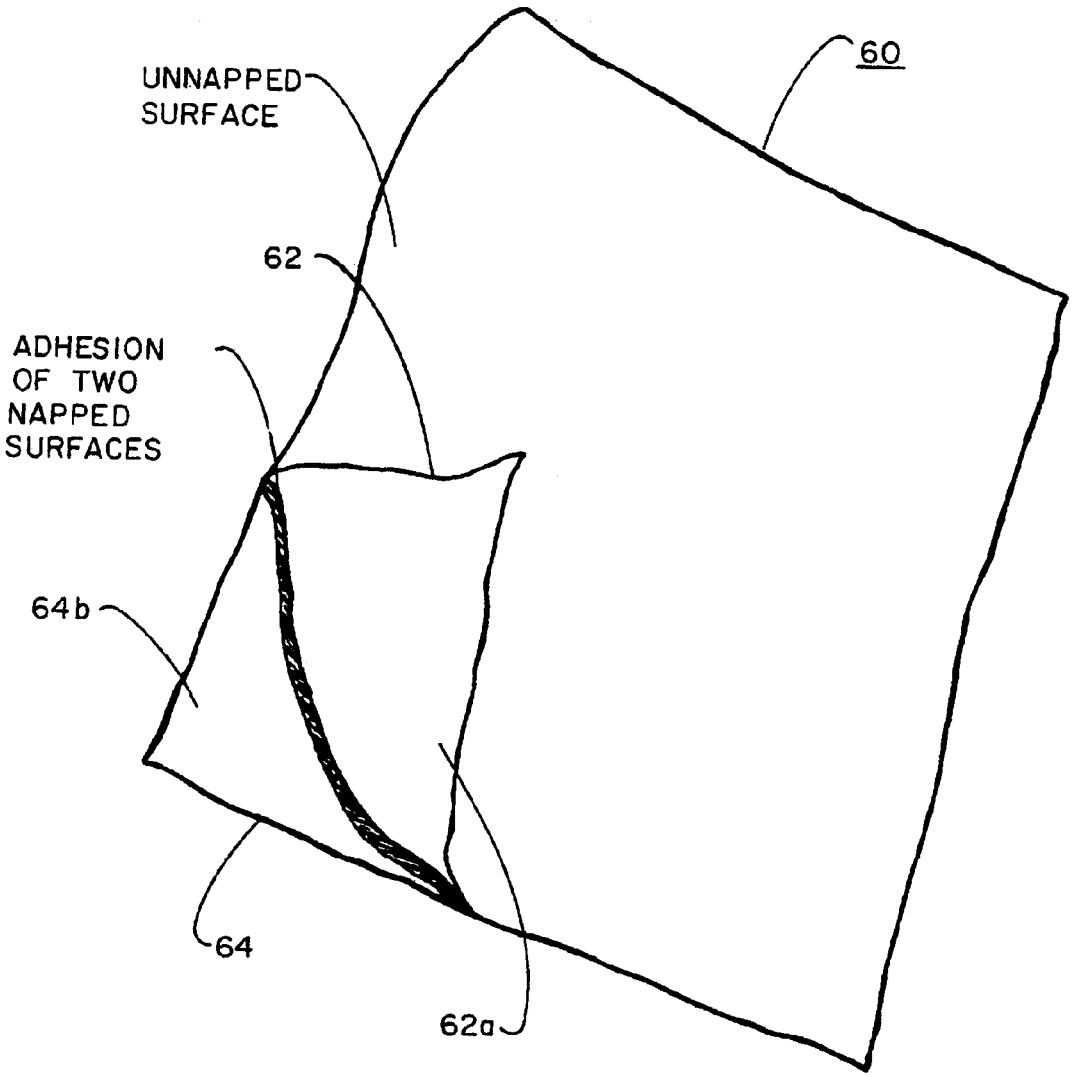
FIG. 17 illustrates a composite fabric including napped fabric components which are bonded into an integral structure employing the hydroenhancing process of the invention.

The following Examples are representative of the results obtained on the process line illustrated in FIG. 17.

EXAMPLE XIV

A plain woven 100% polyester fabric comprised of friction spun yarn having the following specifications was processed in accordance with the inventive: count of 16×10 yarns/in$^2$, weight of 8 ounces/yd$^2$, an abrasion resistance of 500 grams (measured by 50 cycles of a CS17 abrasion test wheel) and an air permeability of 465 ft$^3$/ft$^2$/min.

The fabric was processed on a test line to simulate a speed of 300 ft/min. on process apparatus including four drums 42 and eighteen nozzles 16 at a pressure of approximately 1500 psi. Energy output to fabric at these process parameters was approximately 0.46 hp-hr/lb. Table XII sets forth control and processed characteristics of the fabric.

TABLE XII

100% Polyester Friction Spun Fabric

| Fabric Characteristic | Control | Processed |
|---|---|---|
| Count (yarns/in.$^2$) | 16 × 10 | 17 × 10 |
| Weight (ounces/yd.$^2$) | 8 | 8.2 |
| Abrasion resistance (cycles) | 50 | 85 |
| Air permeability (ft$^3$ft$^2$/min.) | 465 | 181 |

EXAMPLES XV AND XVI

The process conditions of Example XIV were employed to process a plain woven cotton osnaburg and plain woven polyester ring spun fabrics yielding the results set forth in Tables XIV and XV.

TABLE XV

Plain Woven Cotton Osnaburg

| Fabric Characteristic | Control | Processed |
|---|---|---|
| Count (yarns/in.$^2$) | 32 × 26 | 32 × 32 |
| Abrasion resistance (cycles) | 140 | 344 |
| Air permeability (ft$^3$ft$^2$/min.) | 710 | 120 |

TABLE XIV

| Fabric Characteristic | Control | Processed |
|---|---|---|
| Count (yarns/in.$^2$) | 44 × 28 | 48 × 32 |
| Abrasion resistance (cycles) | 100 | 225 |
| Air permeability (ft.$^3$/ft$^2$/min.) | 252 | 63 |

Fabrics processed in Examples XIV–XVI are characterized by a substantial reduction in air permeability and increase in abrasion resistance. Process energy levels in these Examples were approximately 0.46 hp-hr/lb. It has been discovered that there is a correlation between process energy and enhancement. Increased energy levels yield optimum enhancement effects.

The foregoing Examples illustrate applications of the hydroenhancing process of the invention for upgrading the quality of single ply woven and knit fabrics.

In an alternative application of the hydroenhancing process of the invention, fabric strata are hydrobonded into integral composite fabric. FIG. 17 illustrates a composite flannel fabric 60 including fabric layers 62, 64. Hydrobonding of the layers is effected by first napping opposing surfaces 62a, 64a of each of the layers to raise surface fibers. The opposing surfaces 62a, 44a are then arranged in overlying relation and processed on the production line of the invention. See FIGS. 1 and 16. Enhancement of the layers 62, 64 effects entanglement of fibers in the mapped surfaces and bonding of the layers to form a integral composite fabric 60. Exterior surfaces 62b, 64b are also enhanced in the process yielding improvements in cover and quality in the composite fabric.

Napped surfaces 62a, 62b are provided by use of conventional mechanical napping apparatus. Such apparatus include cylinders covered with metal points or teasel burrs which abrade fabric surfaces.

Advantageously, composite fabric 60 is manufactured without requirement of conventional laminating adhesives. As a result, the composite fabric breaths and has improved tactile characteristics than obtained in prior art laminated composites. It will be recognized that such composite fabrics have diverse applications in field such as apparel and footwear.

Optimum enhancement (in single and multi-ply fabrics) is a function of energy. Preferred results are obtained at energy levels of approximately 0.46 hp-hr/lb. Energy requirements will of course vary for different fabrics as will process conditions required to achieve optimum energy levels. In general, process speeds, nozzle configuration and spacing may be varied to obtain preferred process energy levels.

Enhanced fabrics of the invention are preferably fabricated of yarns including fibers having deniers and lengths, respectively, in the range of 0.3 to 10.0 and 0.5 to 6.0 inches, and yarn counts of 0.5s to 80s. Optimum enhancement is obtained in fabrics having fiber deniers in the range of 0.5 to 6, staple fibers of 0.5 to 6.0 inches, and yarn counts in the range of 0.5s to 50s. Preferred yarn spinning systems employed in the invention fabrics include cotton spun, wrap spun and wool spun. Experimentation indicates that preferred enhancement results are obtained in fabrics including low denier, short lengths fibers, and loosely twisted yarns.

The invention advances the art by recognizing that superior fabric enhancement can be obtained under controlled process conditions and energy levels. Heretofore, the art has not recognized the advantages and the extent to which hydroenhancement can be employed to upgrade fabric quality. It is submitted that the results achieved in the invention reflect a substantial and surprising contribution to the art.

Numerous modifications are possible in light of the above disclosure. For example, although the preferred process and apparatus employ fluid pervious support members, nonporous support members are within the scope of the invention. Similarly, FIGS. 1 and 16 respectively illustrate two and four stage enhancement process lines. System configurations which include one or more modules having flat, drum or other support member configuration may be employed in the invention.

It will be recognized that the process of the invention has wide application for the production of a diversity of enhanced fabrics. Thus, the Examples are not intended to limit the invention.

Finally, although the disclosed enhancement process employs columnar jet orifices to provide a fluid curtain, other apparatus may be employed for this purpose. Attention is directed to the International Patent Application (RO/US) to Siegel at al., entitled "Apparatus and Method For Hydropatterning Fabric", filed concurrently herewith, assigned to Veratec, Inc., which discloses a divergent jet fluid entangling apparatus for use in hydropatterning woven and nonwoven textile fabrics.

Therefore, although the invention has been described with reference to certain preferred embodiments, it will be appreciated that other hydroentangling apparatus and processes may be devised, which are nevertheless within the scope and spirit of the invention as defined in the claims appended hereto.

We claim:

1. A method for enhancing *textile fabrics over the fabrics before treatment* and *for* finishing textile fabrics*, the fabrics* including *either or both of* spun [and/or] *and* spun filament yarns which intersect at cross-over points, and first and second sides[, the fabric including yarn fibers having deniers and lengths in the range of 0.3 to 16.0 and 0.5 to 8 inches, respectively, and yarn counts in the range of 0.5s to 80s], the method comprising the steps of:

supporting the fabric on a first support member, *the fabric including yarn fibers having deniers and lengths in the range of 0.3 to 16.0 and 0.5 to 8 inches, respectively, and yarn counts in the range of 0.5s to 80s,* and traversing the first side of said fabric with a first continuous curtain of *non-compressible* fluid for sufficient duration to effect entanglement of said yarns at the cross-over points, thereby enhancing fabric cover and quality, said curtain of fluid impacting the fabric with [an] *a cumulative* energy in the range *of* 0.1 [and] *to* 2.0 hp-hr/lb.

2. The method of claim 1, wherein said fluid curtain is provided by columnar fluid [jet] *jets having* orifices having a diameter of approximately 0.005 inches, center-to-center spacing of approximately 0.017 inches, and spacing from said first support member of approximately 0.5 inches, said fluid jets impinging the fabric with fluids at a pressure of approximately 1500 psi.

3. The method of claim 2, wherein said support member includes a pattern of closely spaced fluid pervious open areas aligned in a first direction to effect fluid passage through said support member.

4. The method of claim 3, wherein said open areas occupy approximately 17 to 40% of said support member.

5. The method of claim 1, comprising the further steps of:

supporting said enhanced fabric on a second support member, and traversing the second side of said enhanced fabric in a second enhancement stage with a second continuous [fluid] curtain of *non-compressible fluid* for sufficient duration to further enhance fabric cover and provide a uniform fabric finish, said second [enhancement stage] *fluid curtain* impacting the fabric with [an] *a cumulating* energy in the range *of* 0.1 [and] *to* 2.0 hp-hr/lb.

6. The method of claim 5, wherein[:] said [first and second] fluid curtains are provided by columnar fluid jets, each having a diameter of approximately 0.005 inches and center-to-center spacing of approximately 0.017 inches, said fluid curtains [are spaced] *originate* approximately 0.5 inches from said first and second members, and [said fluid jets] impinge approximately the fabric with fluids at a pressure of approximately 1500 psi, *and* said first and second support members each include a pattern of closely spaced fluid pervious open areas, respectively aligned in first and second directions, said open areas being dimensioned to effect fluid passage through said support members without imparting a patterned effect to the fabric.

7. The method of claim 6, wherein said open areas occupy approximately 17 to 40% of each of said first and second support members.

8. The method of claim 7, wherein said first and second support members respectively have flat and drum configurations.

9. The method of claim 8, wherein said first and second directions are offset approximately 45°.

10. The method of claim 7, wherein said first and second support members have drum configurations.

11. The method of claim 10, wherein said first and second directions are offset approximately 45°.

12. The method of claim 6, comprising the [further] *subsequent* step[, following said further enhancement] of drying the [enhanced] fabric to a specified width under tension.

13. An enhanced textile fabric *enhanced over the fabric before treatment and* made by the method of claim 6,[the fabric including yarn fibers having deniers and lengths in the range of 0.3 to 16 and 0.5 to 8 inches, respectively, and thread counts in the range of 0.5s to 80s, the yarn cross-over points in the fabric weave define interstitial open areas,] wherein the [process] *method* effects [enhancement] *blooming* of the yarns in [the] interstitial open areas *defined by the cross-over points in the fabric weave*, thereby enhancing fabric cover *and quality*.

14. [An] *The* enhanced textile fabric [made by the method] of claim [6] *13*, *wherein* the fabric [including] *includes* yarn fibers having deniers and lengths in the range of 0.5 to 6 and 0.5 to 8 inches, respectively, and thread counts in the range of 0.5s to 50s, [the yarn cross-over points in the fabric weave define interstitial open areas, wherein the process effects enhancement of the yarns in the interstitial open areas, thereby enhancing fabric cover, and yields] *and demonstrates* a reduction in fabric air permeability in the range of 10 to 90% *after finishing*.

15. An enhanced woven polyester fabric *enhanced over the fabric before treatment and* made by the method of claim 6, wherein the fabric includes 2 denier, 1.9 inch polyester fiber, open-end cotton spun yarn having a yarn number of 17s and count of 49×23 per inch, and the process yields an approximate 48% reduction in air permeability in the fabric.

16. An enhanced woven acrylic fabric *enhanced over the fabric before treatment and* made by the method of claim 6, wherein the fabric includes 3 denier, 1.5 inch fiber, open-end cotton warp yarn having a yarn number of 9s, 28 ends per inch, and a 3 denier, 3 inch acrylic fiber open-end wool spun fill yarn having a number of 4s, 16 picks per inch, and the process yields an approximate 36% reduction in air permeability in the fabric.

17. An enhanced acrylic wrap spun fabric *enhanced over the fabric before treatment and* made by the method of claim 6, wherein the fabric includes 3 denier, 3.0 inch acrylic fiber, wrap spun with 100 denier textured polyester yarn having a yarn number of 4s and count of 14×16 per inch, and the process yields an approximate 65% reduction in air permeability in the fabric.

18. An enhanced woven acrylic fabric *enhanced over the fabric before treatment and* made by the method of claim 6, wherein the fabric includes 3 denier, 1.5 inch acrylic fiber, open-end cotton spun warp yarn having a yarn number of 9s, 28 ends per inch, and a 3 denier, 3 inch acrylic fiber, hollow wrap spun fill yarn, 6 twists per inch having a number of 4s, 16 picks per inch, and the process yields an approximate 48% reduction in air permeability in the fabric.

19. An enhanced woven acrylic fabric *enhanced over the fabric before treatment and* made by the method of claim 6, wherein the fabric includes 3 denier, 1.5 inch acrylic fiber, open-end wool spun warp yarn having a yarn number of 4s, 14 ends per inch, and a 3 denier, 3 inch acrylic fiber, open-end wool spun fill yarn having a yarn number of 2.6s, 16 picks per inch, and the process yields an approximate 48% reduction in air permeability in the fabric.

20. An enhanced woven *fabric enhanced over the fabric before treatment* and made by the method of claim 6, wherein the fabric includes 80% wool/20% nylon in a 2×1 twill weave, and the process yields an approximate 49.5% reduction in air permeability in the fabric.

21. An enhanced 53% polyester/47% cotton fabric *enhanced over the fabric before treatment and* made by the method of claim 6, wherein the fabric includes a 3×1 twill weave, a thread count of 120 ends×38 picks, and the process yields an approximate 50.6% reduction in air permeability in the fabric.

22. An enhanced 50% polyester/50% cotton doubleknit fabric *enhanced over the fabric before treatment and* made by the method of claim 6, wherein the fabric includes wrap spun yarn with 100 denier polyester wrap, and the process yields an approximate 16% reduction in air permeability in the fabric.

23. [An enhanced] *A uniformly finished* woven or knit textile fabric [which comprises:] *comprising either or both of* spun [and/or]*and* spun filament yarns which intersect at cross-over points to define interstitial open areas, *said yarns defining a top and bottom surface,* said yarns including fibers having deniers and lengths in the range of 0.3 to 16.0 and 0.5 to 8 inches, respectively, wherein *said fiber of* said yarns are fluid entangled in said interstitial open areas, *at least in a plane between said surfaces of said fabric,* by application of *a continuous curtain of non-compressible* fluid energy in the range of 0.1 to 2.0 hp-hr/lb.

24. An enhanced woven or knit textile fabric according to claim 23, wherein the yarn is cotton spun.

25. An enhanced woven or knit textile fabric according to claim 23, wherein the yarn is wrap spun.

26. An enhanced woven or knit textile fabric according to claim 23, wherein the yarn is wool spun.

27. A method for hydrobonding woven or knit fabric materials to form a composite textile fabric, the fabric including *either or both of* spun [and/or] *and* spun filament yarns in a structured pattern including yarns which intersect at cross-over points, the method comprising the steps of:

napping first and second surfaces of the fabric to raise surface fibers thereof, arranging said first and second surfaces in opposing and overlying layered relation, supporting the layered fabric on a support member, and traversing one side of said layered fabric with a first continuous curtain of fluid for sufficient duration to effect entanglement of said raised surface fibers in said first and second surfaces, said curtain of fluid impacting the fabric with an energy in the range *of* 0.1 [and] *to* 2.0 hp-hr/lb.

28. The method of claim 27, wherein said fluid curtain is provided by columnar fluid jet orifices having a diameter of approximately 0.005 inches and center-to-center spacing of approximately 0.017 inches, said fluid curtain impinging the fabric with fluids at pressure of approximately 1500 psi.

29. The method of claim 28, wherein said support member includes a pattern of closely spaced fluid pervious open areas aligned in a first direction to effect fluid passage through said support member.

30. The method of claim 29 wherein said open areas occupy approximately 17 to 40% of said support member.

31. The method of claim 27, comprising the further steps of:

supporting said layered fabric on a second support member, and traversing the other side of said layered fabric in a second entanglement stage with a second continuous fluid curtain to effect a uniform composite fabric bond and finish, said second entanglement stage impacting the layered fabric with an energy in the range *of* 0.1 [and] *to* 2.0 hp-hr/lb.

32. The method of claim 31, wherein:

said first and second fluid curtains are provided by columnar fluid jets having a diameter of approximately 0.005 inches and center-to-center spacing of approximately 0.017 inches, said fluid jets impinging the fabric with fluids at pressure of approximately 1500 psi, said first and second support members each include a pattern of closely spaced fluid pervious open areas, respectively aligned in first and second directions, said open areas being dimensioned to effect fluid passage through said support members without imparting a patterned effect to the fabric.

33. An enhanced composite woven or knit textile fabric [which comprises] *which is enhanced by the bonding together of at least two fabric layers, the fabric comprising*:

at least two fabric layers which each include *either or both of* spun [and/or] *and* spun filament yarns in a structured pattern of yarns which intersect at cross-over points, said fabric layers including first and second napped surfaces which have raised surface fibers, said napped surfaces being arranged in overlying and opposed relation and bonded together by dynamic fluid energy through entanglement of said raised surface fibers in said first and second surfaces.

34. An apparatus for enhancing *woven and knit fabric over the fabric before treatment* and *for* finishing woven and knit fabric, *the fabric* including *either or both of* spun [and/or] *and* spun filament yarn, by impacting the fabric with pressurized fluid jets, the fabric including yarns which intersect at cross-over points, and first and second sides, the apparatus comprising:

conveyor means for conveying the fabric in a machine direction ("MD") through a production line including a first enhancing station, said conveying means supporting a first support member which underlies the fabric in said enhancing station;

curtain means spaced from said first support member for directing a *continuous* curtain of *non-compressible* fluid onto [the] *a* first side of the fabric, said curtain means including a plurality of densely spaced *jet* orifices which eject high pressure fluid [jets];

said curtain means coacting with said first support member, *and impacting the fabric with a cumulative energy in the range of 0.1 to 2.0 hp-hr/lb,* to entangle fabric yarns at [the] *their* cross-over points, [enhancing] *enhance* fabric cover and [imparting] *impart* a uniform finish to the fabric.

35. An apparatus as set forth in claim 34, wherein said fluid orifices have a columnar configuration, a diameter of approximately 0.005 inches and center-to-center spacing of approximately 0.17 inches, and impart energy to the fabric of approximately 0.1 to 2.0 hp-hr/lb.

36. An apparatus as set forth in claim 35, wherein said fluid jets have a spray pressure of approximately 1500 psi.

37. An apparatus as set forth in claim 34, further comprising a second enhancing station, a second support member which underlies the fabric and is supported for movement on the production line by said conveyor means, and a second curtain means spaced from said second support member for directing a *continuous* curtain of *non-compressible* fluid onto the second side of the fabric, said second curtain means including a second plurality of densely spaced *jet* orifices which eject high pressure fluid [jets], thereby further enhancing the fabric.

[38. An apparatus as set forth in claim 37, wherein said first and second fluid curtains respectively impart energy to the fabric of approximately 0.1 to 2.0 hp-hr/lb.]

39. An apparatus as set forth in claim [38] *37*, wherein said *first and* second support [member is] *members are* fluid pervious and [has] *have* open areas aligned on a bias relative to the machine direction of the line.

40. An apparatus as set forth in claim 39, wherein said first and second curtain means are spaced approximately 0.5 inches from said first and second support members, said fluid jets have a spray pressure of approximately 1500 psi, and conveyor means speed is approximately 100 fpm.

41. An apparatus as set forth in claim 40, wherein said first and second support members respectively have generally flat and cylindrical configurations.

42. *A method for uniformly finishing woven or knitted textile fabrics including either or both of spun and spun filament yarns which intersect at cross-over points, and first and second sides, the method comprising the steps of:*

*supporting the fabric on a support member, the fabric including yarn fibers having deniers and lengths in the range of 0.3 to 16.0 and 0.5 to 8 inches, respectively, and yarn counts in the range of 0.5s to 80s;*

*conveying the supported fabric in a machine direction;*

*traversing the conveyed fabric on at least a first side with a proximate stationary array of closely and uniformly spaced liquid jets aligned in a cross-direction relative to the machine direction and emanating from orifices, each having an axis substantially perpendicular to the fabric;*

*selecting conveying speed, jet pressure, and the diameter and center-to-center spacing of the orifices, as a function of fabric type and weight, to impact the fabric with a cumulative energy of 0.1 to 2.0 hp-hr/lb in order to effect entanglement of yarns at cross-over points and to provide a uniformly finished fabric; and*

*drying the fabric.*

*43. A method according to claim 42, wherein conveying speed is approximately 100 fpm, jet pressure is approximately 1500 psi, and the jets are columnar and have diameters and center-to-center spacings of approximately 0.005 inches and approximately 0.034 inches respectively.*

*44. A method according to claim 43, wherein the jets are approximately 0.5 inches from the support member.*

*45. A method according to claim 42, wherein the support member is liquid pervious and includes open areas of 17–40% and has a fine mesh pattern which permits fluid passage without imparting a patterned effect to the fabric.*

*46. A method according to claim 45, wherein the support includes a fine mesh screen arranged in offset relation to the machine direction.*

*47. A method according to any of claims 42–46, wherein the fabric is treated on both sides.*

*48. A method according to any of claims 42–46, wherein the array of jets is provided by a plurality of parallel manifolds spaced approximately 8 inches apart.*

*49. A method according to claim 42, wherein the pressure is approximately 1500 psi, the jet diameter is approximately 0.005 inches, the center-to-center spacing of the jets provides approximately 60 jets per inch, and the fabric is impacted with a cumulative energy of approximately 0.46 hp-hr/lb.*

*50. A method according to any of claims 42–46, wherein the fabric includes low denier, short length fibers and loosely twisted yarns.*

*51. An apparatus for uniformly enhancing and finishing woven or knitted textile fabrics of either or both of spun and spun filament yarns by impacting the fabric with pressurized fluid jets, the fabric including yarns which intersect at cross-over points, and first and second sides, the apparatus comprising:*

*a fabric support member underlying the fabric;*

*means for conveying the supported fabric in a machine direction through a production line including a first enhancing station;*

*means for impacting the conveyed fabric on at least one side thereof with a proximate stationary array of closely and uniformly linearly spaced high pressure liquid jets aligned in a cross-direction relative to the machine direction and emanating from orifices, each having an axis substantially perpendicular to the fabric forming a curtain, the liquid jets spaced from the support member;*

*wherein the conveying speed, jet pressure, and the diameter and center-to-center spacing of the jet orifices are selected as a function of fabric type and weight, to impact the fabric with a cumulative energy of 0.1 to 2.0*

*hp-hr/lb through coaction with the support member to entangle fabric yarns at cross-over points, enhance fabric cover, and impart an enhanced and uniform finish to the fabric.*

*52. An apparatus according to claim 51, wherein the conveyor speed is approximately 100 fpm, jet pressure is approximately 1500 psi, and the jets are columnar and have diameters and center-to-center spacings of approximately 0.005 inches and approximately 0.017 inches respectively.*

*53. An apparatus according to claim 52, wherein the jets are approximately 0.5 inches from the support member.*

*54. An apparatus according to claim 51, wherein the support member is liquid pervious and includes open areas of 17–40% and has a fine mesh pattern which permits fluid passage without imparting a patterned effect to the fabric.*

*55. An apparatus according to claim 54, wherein the support includes a fine mesh screen arranged in offset relation to the machine direction.*

*56. An apparatus according to any of claims 51–55, wherein the fabric is treated on both sides.*

*57. An apparatus according to any of claims 51–55, wherein the array of jets is provided by a plurality of parallel manifolds spaced approximately 8 inches apart.*

*58. An apparatus according to claim 51, wherein the pressure is approximately 1500 psi, the jet diameter is approximately 0.005 inches, the center-to-center spacing of the jets provides approximately 60 jets per inch, and the fabric is impacted with a cumulative energy of approximately 0.46 hp-hr/lb.*

*59. An apparatus according to any of claims 51–55, wherein the fabric includes low denier, short length fibers and loosely twisted yarns.*

*60. An apparatus for uniformly enhancing and finishing woven or knitted textile fabrics of either or both of spun and spun filament yarns by impacting the fabrics with pressurized fluid jets, the fabric including yarns which intersect at cross-over points, and first and second sides, the apparatus comprising:*

*a fabric support member underlying the fabric;*

*a conveyor for moving the supported fabric in a machine direction through a production line including a first enhancing station;*

*a plurality of stationary parallel manifolds aligned in a cross-direction relative to the machine direction, each of said plurality of stationary parallel manifolds having a plurality of densely spaced high pressure liquid jets spaced from and directed substantially perpendicular to the fabric for forming a curtain;*

*wherein conveyor speed, and the pressure, diameter and center-to-center spacing of the manifold jets are selected as a function of fabric type and weight, to impact one side of the fabric with a cumulative energy of 0.1 to 2.0 hp-hr/lb through coaction with the support member to entangle fabric yarns at cross-over points, enhance fabric cover, and impart an enhanced and uniform finish to the fabric.*

*61. An apparatus according to claim 60, wherein the conveyor speed is approximately 100 fpm, jet pressure is approximately 1500 psi, and the jets are columnar and have diameters and center-to-center spacings of approximately 0.005 inches and approximately 0.017 inches respectively.*

*62. An apparatus according to claim 61, wherein the jets are approximately 0.5 inches from the support member.*

*63. An apparatus according to claim 60, wherein the support member is liquid pervious and includes open areas of 17–40% and has a fine mesh pattern which permits fluid passage without imparting a patterned effect to the fabric.*

*64. An apparatus according to claim 63, wherein the support includes a fine mesh screen arranged in offset relation to the machine direction.*

*65. An apparatus according to any of claims 60–64, wherein the fabric is treated on both sides.*

*66. An apparatus according to claim 60, wherein the pressure is approximately 1500 psi, the jets are columnar and have a diameter of approximately 0.005 inches, with center-to-center spacing which provides approximately 60 jets per inch, and wherein the fabric is impacted with a cumulative energy of approximately 0.46 hp-hr/lb.*

*67. An apparatus according to any of claims 60–64, wherein the fabric includes low denier, short length fibers and loosely twisted yarns.*

*68. A uniformly enhanced woven or knitted textile fabric made according to claim 42, wherein the fabric yarns are bloomed and entangled at cross-over points defined by intersecting warp and fill yarns of the fabric, thereby filling interstitial open areas between adjacent yarns.*

*69. A uniformly enhanced fabric according to claim 68, wherein the fabric includes low denier, short length fibers and loosely twisted yarns.*

*70. A uniformly enhanced woven or knit textile fabric comprising*

*either or both of spun and spun filament yarns which intersect at cross-over points to define interstitial open areas,*

*the yarns including fibers having deniers and lengths in the range of 0.3 to 16.0 and 0.5 to 8 inches, respectively, wherein*

*the yarns are uniformly bulked, entangled in the interstitial open areas, and bloomed by an array of densely packed liquid jets which deliver from 0.1 to 2.0 hp-hr/lb of energy,*

*and the enhanced fabric demonstrates a substantial improvement in at least two of air permeability, abrasion resistance, tensile strength, edge fray, seam slippage, wrinkle recovery, torque resistance, and fabric weight.*

*71. A uniformly enhanced fabric according to claim 70, made from loosely twisted yarns.*

* * * * *